(12) United States Patent
McGreer et al.

(10) Patent No.: US 10,551,643 B2
(45) Date of Patent: Feb. 4, 2020

(54) COMPACT, ENERGY EFFICIENT MACH-ZEHNDER INTERFEROMETERS AND OPTICAL ATTENUATORS

(71) Applicant: NeoPhotonics Corporation, San Jose, CA (US)

(72) Inventors: Kenneth McGreer, Livermore, CA (US); Calvin Ho, San Jose, CA (US)

(73) Assignee: NeoPhotonics Corporation, San Jose, CA (US)

( * ) Notice: Subject to any disclaimer, the term of this patent is extended or adjusted under 35 U.S.C. 154(b) by 0 days.

(21) Appl. No.: 16/380,234

(22) Filed: Apr. 10, 2019

(65) Prior Publication Data

US 2019/0235285 A1 Aug. 1, 2019

Related U.S. Application Data

(63) Continuation of application No. 15/846,413, filed on Dec. 19, 2017, now Pat. No. 10,302,975.

(60) Provisional application No. 62/437,110, filed on Dec. 21, 2016.

(51) Int. Cl.
*G02F 1/01* (2006.01)
*G02F 1/225* (2006.01)
*G02F 1/21* (2006.01)

(52) U.S. Cl.
CPC ............ *G02F 1/0147* (2013.01); *G02F 1/225* (2013.01); *G02F 1/2257* (2013.01); *G02F 2001/212* (2013.01); *G02F 2201/06* (2013.01); *G02F 2202/09* (2013.01); *G02F 2203/48* (2013.01); *G02F 2203/50* (2013.01)

(58) Field of Classification Search
CPC ...... G02F 1/0147; G02F 1/225; G02F 1/2257; G02F 2001/212; G02F 2201/06; G02F 2202/09; G02F 2203/48; G02F 2203/50
USPC ....................................................... 385/1–3
See application file for complete search history.

(56) References Cited

U.S. PATENT DOCUMENTS

| | | | |
|---|---|---|---|
| 5,165,001 | A | 11/1992 | Takagi et al. |
| 6,615,615 | B2 | 9/2003 | Zhong et al. |
| 6,658,174 | B2 | 12/2003 | Doerr |
| 6,760,499 | B2 | 7/2004 | Pezeshki et al. |

(Continued)

OTHER PUBLICATIONS

International Search Report and Written Opinion for co-pending international application No. PCT/US2017/0067339 dated Apr. 30, 2018 (14 pages).

*Primary Examiner* — Michael P Mooney
(74) *Attorney, Agent, or Firm* — Christensen, Fonder, Dardi & Herbert PLLC; Peter S. Dardi

(57) ABSTRACT

Mach-Zehnder interferometers comprise heater elements configured to have projections in the plane of optical waveguides positioned such that two adjacent sections of one optical waveguide arms are heated by a common heater element. The heater and at least a substantial section of the heated waveguide segments can be curved. Configurations of an optical waveguide arm can comprise an outer curved heated section, an inner curved heated section, and a loop-back waveguide section connecting the outer curved heated section and the inner curved heated section, with average radius of curvature selected to form an open accessible space. Appropriate configurations of the two optical waveguide arms provide for nested configurations of the arms that provide for a compact structure for the interferometer.

21 Claims, 22 Drawing Sheets

(56) References Cited

U.S. PATENT DOCUMENTS

| | | |
|---|---|---|
| 6,766,083 B2 | 7/2004 | Bona et al. |
| 6,980,707 B2 | 12/2005 | Chiba et al. |
| 7,160,746 B2 | 1/2007 | Zhong et al. |
| 7,162,120 B2 | 1/2007 | Yamazaki |
| 7,389,033 B2 | 6/2008 | Hashizume et al. |
| 7,447,393 B2 | 11/2008 | Yan et al. |
| 7,627,203 B2 | 12/2009 | Chen et al. |
| 7,676,121 B2 | 3/2010 | Gill et al. |
| 7,720,328 B2 | 5/2010 | Yan et al. |
| 7,961,991 B2 | 6/2011 | Hasegawa et al. |
| 8,103,136 B2 | 1/2012 | Chen et al. |
| 2003/0039461 A1 | 2/2003 | How Kee Chun et al. |
| 2008/0159681 A1 | 6/2008 | Gill et al. |
| 2012/0062900 A1 | 3/2012 | Langley et al. |
| 2012/0195544 A1 | 8/2012 | Shen et al. |
| 2014/0375999 A1 | 12/2014 | Okamoto |
| 2016/0127070 A1 | 5/2016 | Nagarajan et al. |
| 2016/0266320 A1 | 9/2016 | Li et al. |
| 2016/0363835 A1* | 12/2016 | Nagarajan ............. G02F 1/2257 |

* cited by examiner

COMPACT, ENERGY EFFICIENT MACH-ZEHNDER INTERFEROMETERS AND OPTICAL ATTENUATORS

CROSS REFERENCE TO RELATED APPLICATIONS

This application is a continuation of copending U.S. patent application Ser. No. 15/846,413 filed Dec. 19, 2017 to McGreer et al., entitled "Compact, Energy Efficient Mach-Zehnder Interferometers and Optical Attenuators," which claims priority to U.S. provisional patent application 62/437,110 filed Dec. 21, 2016 to McGreer et al., entitled "Compact Phase Shifters and Corresponding Mach-Zehnder Interferometers," both of which are incorporated herein by reference.

FIELD OF THE INVENTION

The invention relates to Mach-Zehnder Interferometers with thermo-optic phase shifters in a planar lightwave circuit which can find application in optical telecommunication systems. The invention further relates to planar lightwave circuits providing variable optical attenuation with efficient power use.

BACKGROUND OF THE INVENTION

Optical components providing a given function for fiber optical communications are progressing towards smaller size with less electrical power consumption. Integrated optical technology such as planar lightwave circuits is a key enabler of this progress. The planar lightwave circuit (PLC) generally is formed on a flat substrate. Materials can be patterned to form optical waveguides that will constrain light of an appropriate wavelength range so that the light may be guided along optical pathways defined by a core material of the waveguide. Types of optical waveguides include, but are not limited to, ridge waveguides, rib waveguides, and channel waveguides. As one example, a channel waveguide with a rectangular cross section may comprise a silica core region surrounded by a silica cladding region wherein the index of refraction of the core region is higher in value than that of the silica cladding region. In such an example, the percentage difference between to two values of index of refraction may be referred to as the index contrast. This particular example may be used to exemplify particular design considerations which may be modified to suit a particular situation by one practiced in the art. However, as known in the art, many other waveguide variations are possible and many other materials suitable for forming optical waveguides (including silicon, InP, various polymers, and various other glass materials) are possible.

Many useful functions within a PLC are provided by static devices; conversely, some functions require dynamic control from circuitry external to the PLC. A thermo-optic phase shifter is a common device that enables dynamic control of various optical functions. Typically, a thermo-optic phase shifter is formed by depositing a thin film of metal onto the top cladding above the optical waveguide. The metal film or semiconductor film can be patterned to define the boundaries of the heater, and herein is referred to as the "heater." Desirable metal materials for heaters resist corrosion and are generally durable, such as tungsten, nickel-chromium alloys (nichrome), and other metals, such as those known in the art. Methods for forming heaters for PLCs include deposition by sputtering, other physical vapor deposition, or other suitably process followed by patterning.

One of the commercially significant devices integrated onto a PLC is a Mach-Zehnder interferometer (MZI). Providing an MZI with an optical phase shifter on one or both of the arms of an MZI can provide dynamic control over some aspects of the MZI function. A number of optical phase shifters are known in the art, including, but not limited to, thermo-optic phase shifters, carrier injection phase shifters, and carrier depletion phase shifters. The transfer function of the MZI is dependent upon the phase shift of the first arm relative to the phase shift of the second arm. In particular, the transfer function of the MZI depends on the differential phase shift and is substantially independent on the amount of phase shift that is common to both arms. When the MZI is configured with at least one thermo-optic phase shifter, the function of the phase shifter is to introduce a temperature difference between the first arm and the second arm and thereby determine the MZI transfer function. An MZI with a phase shifter on one or both arms may be used as an optical switch or, alternatively, as a variable optical attenuator (VOA).

SUMMARY OF THE INVENTION

In a first aspect, the invention relates to a planar lightwave circuit comprising a Mach-Zehnder interferometer along a plane of the circuit, the Mach-Zehnder interferometer comprising an input optical coupler, an output optical coupler, a first optical waveguide arm optically connecting between the input optical coupler and the output optical coupler, a first heater configured to heat both the outer curved heated section and the inner curved heated section of the first optical waveguide arm, and a second optical waveguide arm not heated significantly by the first heater and optically connected between the input optical coupler and the output optical coupler. In some embodiments, the first optical waveguide arm comprises an outer curved heated section, an inner curved heated section, and a loopback waveguide section connecting the outer curved heated section and the inner curved heated section. The outer curved heated section and inner curved heated section can be adjacent each other with the inner curved heated section having a smaller average radius of curvature than the outer curved heated section and a larger average radius of curvature than the loopback waveguide section such that an open accessible space enclosed in part by the arc of the inner curved heated section. In some embodiments, the second optical waveguide arm comprises an outer curved section, an inner curved section adjacent the outer curved section and a loopback waveguide section, at least a portion of the loopback waveguide of the second optical waveguide arm being located in the open accessible space of the first optical waveguide arm.

In a further aspect, the invention pertains to a planar lightwave circuit comprising a Mach-Zehnder interferometer along a plane of the planar lightwave circuit the Mach-Zehnder interferometer comprising an input optical coupler, an output optical coupler, a first optical waveguide arm optically connecting between the input optical coupler and the output optical coupler, a first heater associated with the first waveguide arm, and a second optical waveguide arm optically connecting between the input optical coupler and the output optical coupler, in which the second optical waveguide is not significantly heated by the heater. The first optical waveguide arm can comprise an outer curved heated section, an inner curved heated section adjacent the outer curved heated section, and a loopback section connecting the outer curved heated section and the inner curved heated section. The first heater can be positioned to significantly heat both the outer curved heated section and the inner curved heated section of the first waveguide arm, in which a projection of the heater in a plane of the waveguides is curved.

In another aspect, the invention pertains to a planar lightwave circuit comprising a Mach-Zehnder interferometer along a plane of the circuit, the Mach-Zehnder interferometer comprising an input optical coupler, an output optical coupler, a first optical waveguide arm optically connecting between the input optical coupler and the output optical coupler, a first heater, and a second optical waveguide arm optically connecting between the optical splitter and the optical coupler. The first heater generally is on cladding over the waveguide core that is associated with the first waveguide arm. A projection of the first heater into the plane of the first waveguide arm can be positioned in the plane between two adjacent sections of the first waveguide arm, the relative positions of the adjacent sections specifying inner edges of the adjacent waveguide sections closest to the adjacent waveguide section and outer edges furthest from the adjacent waveguide section perpendicular to the light path, and with an extent of the heater in the plane no further than the outer edges of the adjacent sections of the first waveguide arm. Generally, the second optical waveguide is not significantly heated by the first heater.

The improved designs described herein rely on innovative waveguide layouts that provide for efficient packing of the devices on the planer structure, while maintaining functional isolation between the respective elements to result in improved energy efficiency.

DETAILED DESCRIPTION OF THE INVENTION

Figure 1:
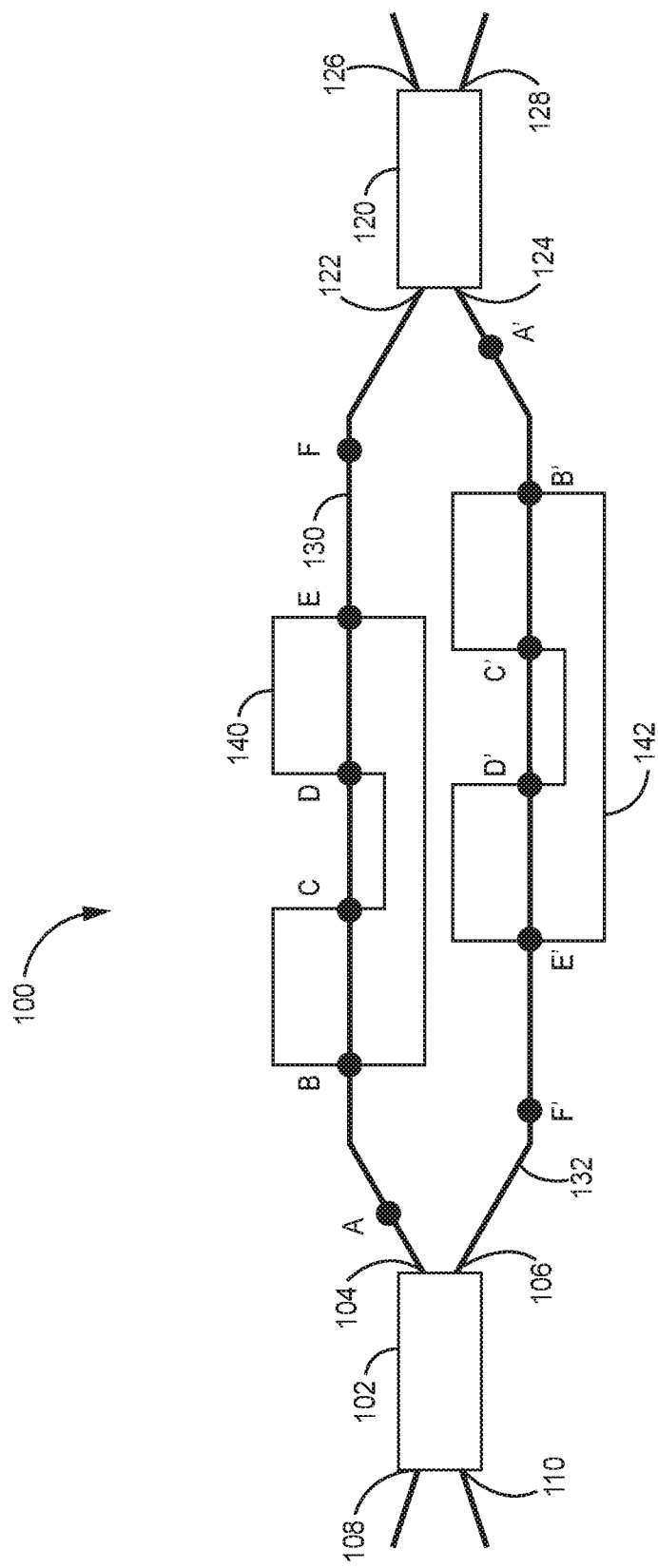
FIG. 1 is a functional schematic top view of an embodiment of a Mach-Zehnder interferometer (MZI) comprising thermo-optic phase shifters on each MZI arm with a schematic indication of waveguide sections that can be configured adjacent to each other for an energy conserving compact structure.

Mach-Zehnder interferometers have been designed with the two arms of the interferometer intertwining along adjacent paths with a loopback structure that provides for the common heating of adjacent segments of one arm of the interferometer without interfering with the other arm of the interferometer. In some embodiments, the devices involve the incorporation of a more energy efficient thermo-optic phase shifter with a design that simultaneously heats two adjacent portions of a waveguide to capture at least a portion of conducted heat to reduce energy consumption for a selected phase shift of light passing through the waveguide. Herein, reference to adjacent waveguide sections includes sections of waveguides, such as portions of the same waveguide, which are laterally adjacent, but are not necessarily longitudinally adjacent. One or both arms of the Mach-Zehnder interferometer can be comprised of a thermo-optical phase shifter with an energy efficient design. To provide for more compact layout of the Mach-Zehnder interferometer while achieving energy efficiency, a folded pattern is described that involves simultaneous bending of the two arms of the interferometer in an intertwined configuration while still providing control of the heating of the individual arms with appropriate waveguide placement. The loopback design of each arm can open an accessible area suitable for the placement of the loop of the other arm within an intertwining structure. The Mach-Zehnder interferometers can be integrated into desired planar optical circuits or packaged along with any additional support components as a separate device, such as a variable optical attenuator. The design of the Mach-Zehnder interferometer also provides for relative compact placement within a planar lightwave circuit such that a corresponding device and/or package size is desirably small.

The energy efficient thermo-optic phase shifters within planar optical waveguide structures can have a loopback structure to bring two sections with opposite light propagation direction for interfacing with a common heating element to improve heating efficiency while providing for a relatively compact arrangement on the planar structure. Generally, the adjacent heated waveguides are connected by a waveguide loop such that the heated sections comprise no more than a selected fraction of the waveguide area. Such structures provide for particularly effective thermal efficiencies and relatively small device areas as well as allowing for flexible device designs. In particular, the two arms of the Mach-Zehnder interferometer can be placed within a common area with portions of two thermo-optic phase shifters nested in each other in a compact design without significant optical or thermal interference between the arms.

The size and power consumption of a Mach-Zehnder interferometer (MZI) is determined, in part, by the selection of material used for the fabrication of the MZI. However, the selection of materials affects many other aspects of the PLC, including cost of production, cost of packaging, and loss associated with optically coupling to the PLC. Various performance factors can be balanced against practical aspects such as ability to integrate the components into other devices of the optical network, cost of the component, which can depend on amount of materials and processing costs and cost of operation. With respect to a thermo-optic phase shifter within a fixed selection of materials, as part of the balance, it can be desirable to reduce the size consistent with reasonable fabrication costs, which can correspondingly reduce production cost and cost of use, as well as power consumption, which can be a significant cost of use. The difference of index of refraction between the waveguide core and the cladding influence the size of the optical structures while maintaining acceptably low loss from propagation. In particular, for curved sections of planar waveguides, maintaining an acceptable loss limits the radius of curvature. Correspondingly, the radius of curvature of curved sections of waveguides can control the packing of optical devices onto a surface. Thus, the smallest acceptable radius of curvature in some sense provides a distance scale for the placement of optical components in a planar lightwave circuit.

The heater for a thermo-optic phase shifter generally comprises a metal film, or other electrically resistive material, over the cladding of an underlying waveguide core. Typically, electrical contact pads are formed at appropriate locations so that an external circuit may provide a voltage difference across the contact pads thereby causing current to flow though heater. The material and geometry of the contact pad may be configured so that it is suitable for using wire bonding as a technique for providing electrical contact to external circuitry. Generally, a passivation layer can be deposited over the patterned metal film to protect the patterned metal film from corrosion while it remains at an elevated temperature during the course of its heating function. Electrical connections to an outside circuit and power source to the heater can be made appropriately through a hole in the passivation or protective layer. As current flows through the heater, electrical power is dissipated and converted to heat which increases the temperature of the material in the vicinity of the heater, including the optical waveguide beneath the heater. By elevating the temperature of the material that forms the optical waveguide, the index of refraction of the material is changed, which changes the phase delay associated with the optical propagation through the waveguide; hence the light emerging form the exit of the heated waveguide is shifted in phase relative to the phase of the light emerging from a similar unheated waveguide. In this context, efficiency can be evaluated by the optical phase shift achieved relative to the electrical power delivered to the heater.

To further satisfy the demand for reduction of component size and of power consumption, it can be desirable for MZI devices to have thermo-optic phase shifters that are more efficient with respect to consumption of electrical power and are either more compact or configured to enable more compact MZI designs. The general concepts of the compact, energy efficient thermo-optic phase shifters are described more completely in a copending and simultaneously filed U.S. publication US 2018/0173025 to McGreer et al. (hereinafter the TOPS application), entitled "Planar Optical Phase Shifters With Efficient Heater Placement," incorporated herein by reference. Embodiments of these efficient thermo-optic phase shifters relevant for the MZI designs described herein are described separately below as well as in the context of the MZI structures.

For the energy efficient configurations, the heater is located to provide heat to two adjacent waveguide sections while not extending too far relative to the outer edges of the waveguides to reduce lost heat not contributing to the optical phase shift and to reduce thermal conduction into other regions of the PLC where it may be desirable to place waveguides that are not intended to be significantly heated, such as the other MZI arm. In some embodiments, in the plane of the structure, the heater structure does not extend beyond the outer edges of the adjacent waveguides. To reduce energy waste from the heater, it is possible to further reduce the heater size while achieving desired optical phase shifts and optical performance. The further reduction in heater size can involve further reductions in heater width and/or introduction of a gap in the heater structure between the adjacent waveguides. The energy saving can be achieved through the capture of some conducted heat that would otherwise be wasted. Further details of heater embodiments are provided in the context of the figures below.

To effectively capture conducted heat for thermo-optic phase shifting purposes, commonly heated adjacent waveguides should be relatively close in the plane of the structure. But the placement of adjacent waveguides can be limited by distance dependent optical crosstalk between the waveguides that introduces noise into transmitted optical signals. Due to natural phase misalignment between adjacent curved waveguides, curved waveguides can be placed closer together without exceeding a selected limit of optical crosstalk. For these embodiments, the heater also can be curved to conform the heater shape to the curved waveguide shape in which the resulting configuration can provide for desired energy efficiency as well as compact placement of the waveguides. With waveguides closer together, the heater can be made correspondingly smaller, which can be desirable from an overall size perspective, and thermal conduction from the heater can be more effectively captured by the adjacent waveguides, which can result in further energy savings from the operation of the thermo-optic phase shifter. While it can be desirable for the adjacent waveguide segments to be curved both from a thermal efficiency standpoint and a packing standpoint, in some embodiments, the adjacent commonly heated waveguide segments can be straight or a combination of straight and curved. The discussion in the following focuses on the curved embodiments since these embodiments provide advantages especially related to compact placement in the MZI, but embodiments of energy efficient thermo-optic phase shifters with straight adjacent heated section are described in more detail in the TOPS application. As explained further below, curved heated adjacent waveguide sections connected with a loop can form an open, accessible area suitable for the placement of a loop of the other MZI arm, and vice versa.

In general, MZI incorporating the phase shifters described herein are designed for reduced energy consumption, and they may or may not save device area relative to a more straightforward design. However, an increase in device size can be undesirable from the perspective of the use of additional materials in the fabrication and the need for more space in the facility maintaining the devices. Thus, to provide commercial value, the devices can balance the energy savings with the various costs associated with any increased device size. The improved devices herein provide desirable packing to provide a smaller corresponding device size while providing good energy savings. Mach-Zehnder interferometers can be used for forming various PLC based devices, such as planar optical attenuators and other optical devices, and MZI can effectively incorporate Applicant's energy efficient thermo-optic phase shifter designs for the formation of correspondingly energy efficient MZI devices.

A functional schematic diagram of an MZI 100 is shown in FIG. 1. MZI 100 comprises an input coupler 102 comprising a first output port 104, a second output port 106, first input port 108, and optional second input port 110, which can be dormant or absent; an output coupler 120 comprising a first input port 122, a second input port 124, first output port 126, and optional second output port 128, which can be dormant or absent; a first waveguide arm 130 optically connecting first output port 104 of input coupler 102 to first input port 122 of output coupler 120; and a second waveguide arm 132 optically connecting second output port 106 of input coupler 102 to second input port 124 of output coupler 120. As used herein, the "waveguides" and portions thereof are referenced relative a core optical material, although the optical cladding does influence the transmission of optical signal even though the optical signals are concentrated within the core. MZI 100 further comprises a first phase shifter 140, generally a heater, on first waveguide arm 130 and a second phase shifter 142, generally a heater, on second waveguide arm 132. Generally, the corresponding phase shifters can be then referred to as thermo-optic phase shifters. In this functional schematic, the physical location of the BC (B'C') segment relative to the DE (D'E') segment is not intended to be indicated in any way by the drawing, but in some desirable embodiments shown below, segments BC (B'C') and DE (D'E') can be physically arranged close to each in the device layout, which can be based on the concepts described in detail herein relating to energy efficient and relatively compact phase shifter designs.

Figure 2:
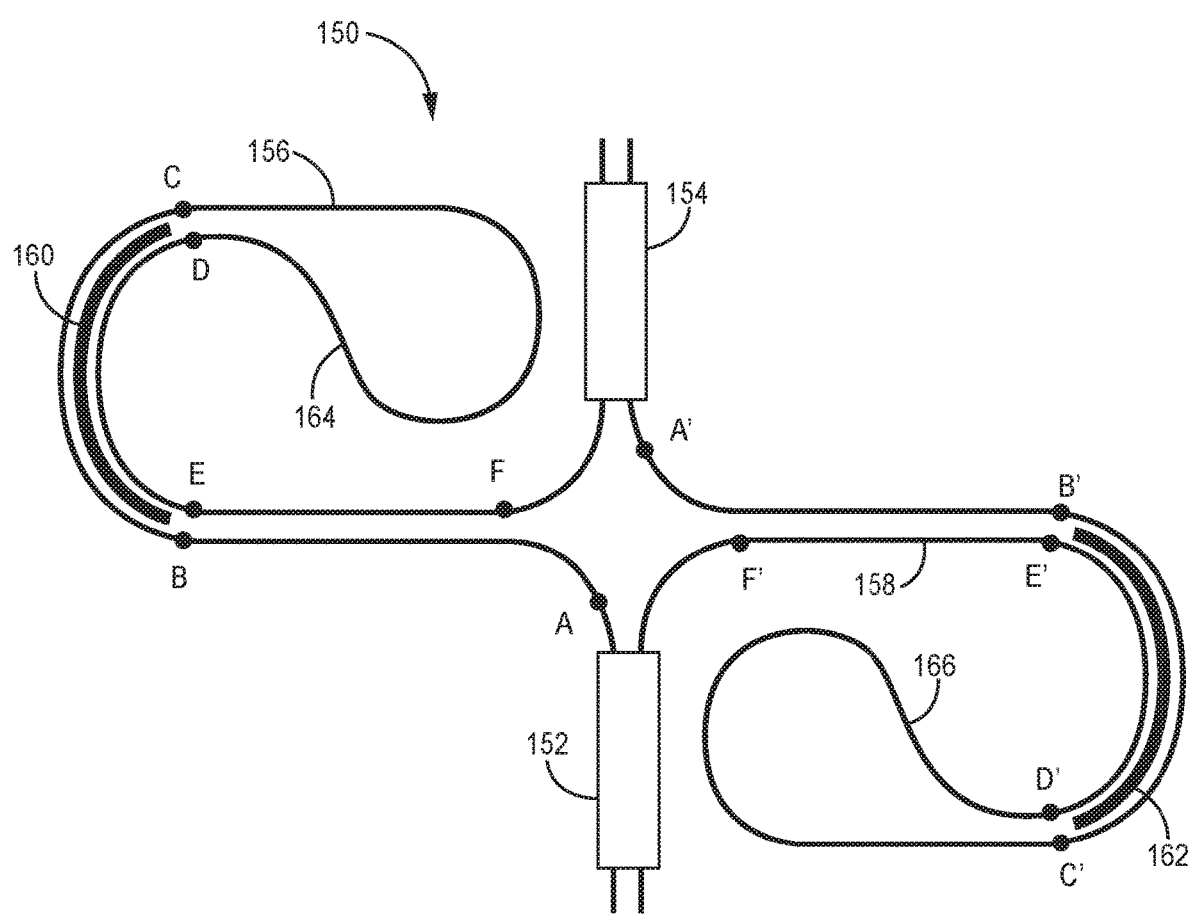
FIG. 2 is a layout schematic top view of an embodiment of an MZI comprising two thermo-optic phase shifters in which two segments of each MZI arm are positioned close to each other for heating with a common heater and in which a loopback waveguide section joins the adjacent commonly heated section.

An embodiment of an MZI 150, with a corresponding MZI layout schematic shown in FIG. 2, represents the comparable device of FIG. 1 while schematically showing relative locations of various segments noted with the corresponding letters on the MZI arm with proportions that are modified from real proportions to aid in the clarity of the perspective. Referring to FIG. 2, MZI 150 comprises input coupler 152, output coupler 154, first MZI arm 156 and second MZI arm 158. A phase shifter/heater 160 on first MZI arm 156 can occupy a non-interfering different location on the PLC than a phase shifter/heater 162 on second MZI arm 158, although an MZI can comprises a single phase shifter/heater in some embodiments. Waveguide loops 164, 166 connected oppositely oriented sections of heated waveguides of first MZI arm 156 and second MZI arm 158, respectively.

The respective arms of the MZI have phase shifter designs can be based on the design of energy efficient phase shifters discussed in more detail below. In particular, FIG. 3 describes an optical phase shifter embodiment with curved heated sections similar to each of the two phase shifters of FIG. 2 along with a heater that has a projection in the plane of the waveguide that is also curved. With an energy conserving MZI embodiment of a phase shifter used in the MZI of FIG. 2, the area of the PLC occupied by the pair of spatially separated MZI arms with phase shifters, is approximately twice the area occupied by an individual MZI arm with their respective phase shifters. Reducing this size-doubling footprint associated with the inclusion of the second phase shifter is an objective of additional compact MZI embodiments described herein.

Figure 3:
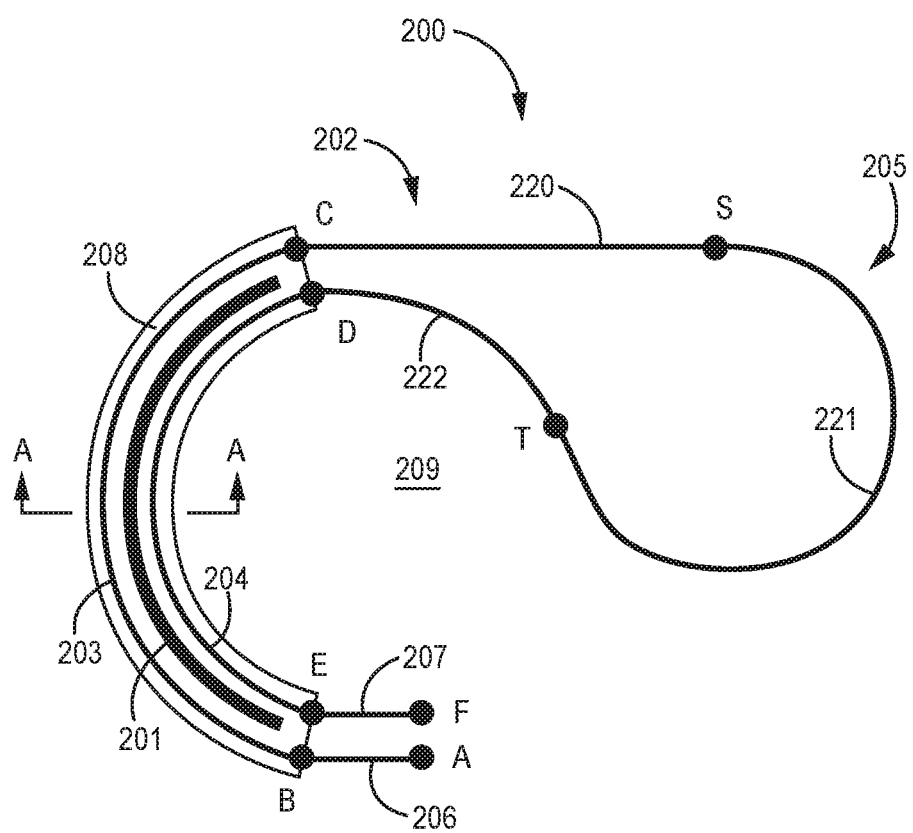
FIG. 3 is a schematic top view of an energy efficient thermo-optic phase shifter of FIG. 2 separated from the MZI structure with two curved heated sections that are positioned adjacent to a common heater.

An embodiment of a phase shifter 200 with curved heated sections is depicted in a schematic top view in FIG. 3. Phase shifter 200 comprises a heater 201, and an optical waveguide 202. Waveguide 202 comprises a first curved heated waveguide section 203 (situated between point B and point C), a second curved heated waveguide section 204 (situated between point D and point E), a loopback optical waveguide section 205 (situated between point C and point D) that optically connects the first and second curved heated waveguide sections, a first connecting waveguide section 206 optically connected to first curved heated waveguide section 203 and second connecting waveguide section 207 optically connected to second curved heated waveguide section 204. Loopback optical waveguide section 205 has a loop marked with points S and T, which are described further below. The letters A-F are selected to orient phase shifter 200 relative to the MZI structure of FIG. 2, although end points A and F are shown arbitrarily ending in FIG. 3 even though in a device the waveguides generally would be connected appropriately within the PLC based on an overall design for the PLC.

Consistent with this configuration, second curved heated waveguide section 204 has a smaller average radius of curvature relative to first curved heated waveguide section 203. The average radius of curvature of loop S-T is smaller than the average radius of curvature of B-C. While FIG. 3 shows loop S-T with a semicircular structure and C-S mostly straight, these conditions can be relaxed, and for the relaxed configurations, the point S can be selected at the point at which the radius of curvature becomes smaller than the average radius of curvature of section B-C. Heater 201 provides a thermal region 208 so that the average temperature within the thermal region is higher than the neighboring region 209 located in the plane of the structure outside of thermal region 208. First curved heated waveguide section 203 and second curved heated waveguide section 204 are within the thermal region 208, and loopback optical waveguide section 205 is within neighboring region 209. Portions of the waveguide 202 that are significantly heated are the portions that are within the thermal region 208, which extends beyond heater 201 area due to thermal conduction. Portions of the waveguide 202 that are within the neighboring region 209 can be considered as unheated or not significantly heated.

In the context of the view in FIG. 3, heater 201 is not intended to have a particular specific relationship with respect to heated waveguide sections 203, 204, in particular with respect to extent on the plane of the structure. Various representative embodiments of the heater with respect to extent on the plane of the device are shown in FIGS. 4-8, which are described further below. Additional specific heater embodiments can be found in the TOPS application, although the ranges of suitable heater structures are commensurate, and in some embodiments broader, herein.

In the embodiment of FIG. 3, the optical waveguide 202 can be described in convenient notation by describing the nominal physical path of the optical waveguide as a parametric curve using "t" as the parameter of the curve, where t=0 at point A and t=1 at point F, each of which are illustrated in FIG. 3. When assembling this phase shifter into a MZI, the waveguide can be further extended from point F, and point A can be connected to a splitter/coupler, as described further below with alternative and additional parameterization of the nominal physical path in the same spirit as shown in FIG. 3. The nominal physical path generally is distinguished from the specific physical path in an actual device because the nominal physical path does not include subwavelength perturbations such as waveguide offsets at the transitions between straight waveguide and curved waveguides that is a common practice in the art and possibly other similar design details. For convention herein, the signed curvature is negative at any point P along the curve wherein an increasing value of parameter t causes a clockwise trajectory in the plane. Correspondingly, the signed curvature is positive at any point P along the curve wherein an increasing value of parameter t causes a counterclockwise trajectory in the plane. The signed curvature is zero at any point P along the curve wherein an increasing value of parameter t causes a linear trajectory. For the purposed herein for any waveguide segment at an arbitrary location with a length along the light path of 10 microns or more, a linear trajectory can be associated with any waveguide segment with a radius of curvature of at least a millimeter, and any segment with a radius of curvature less than a millimeter is considered curved. Similarly, a heating element placed to conform to one or two curved waveguide segments can be considered a curved heater through examination of the contours of the heating element in the plane of the waveguides.

As illustrated in FIG. 3, the first curved heated waveguide section 203 has a signed curvature that has a constant value that is negative along the entire length of the section, and the second curved heated waveguide section 204 has a signed curvature that has a constant value that is positive along the entire length of the section. Correspondingly, curved heated waveguide sections 203 and 204 have opposite optical propagation directions resulting from the curvature of loopback optical waveguide section 205. However, other embodiments are anticipated for which the first curved heated waveguide section 203 has a signed curvature that varies along the segment length and may even have points along the segment for which the signed curvature is zero in value. For example, the first curved heated waveguide section may follow a spline curve, wherein the radius of curvature continuously varies or intermittently varies along the length of the curved heated waveguide or, alternatively, may have one or more linear segments alternating with nonlinear segments. Likewise, other embodiments are contemplated for which the second curved heated waveguide section 204 has a signed curvature that varies along the segment length and may even have points along the segment for which the signed curvature is zero in value. For these embodiments, an average radius of curvature can be considered for these sections. However, embodiments for which the first curved heated waveguide section 203 has a signed curvature of zero along its entire length (that is embodiments for which the first curved heated waveguide section is a linear section) does not take advantage of the opportunity to achieve a desired compact configuration. Likewise, embodiments for which the second curved heated waveguide section 204 has a signed curvature of zero along its entire length (that is embodiments for which the second heated waveguide section is a linear section) does not take advantage of the opportunity to achieve a desirably compact configuration. FIG. 3 depicts an embodiment that achieves desirable compactness by configuring the first curved heated waveguide section 203 and the second curved heated waveguide section 204 with signed curvature values that have similar magnitudes and opposite signs. Additional details related to the values of the signed curvature that can achieve compactness and efficiency are described below.

Three waveguide segments are marked along loopback optical waveguide section 205 (points C-D) in FIG. 3. Point T marks a transition point where the curvature along the parameterized waveguide changes from positive to negative, and point S marks a transition point from a highly curved loop segment (S-T) 221 to a straight or slightly curved segment along loop section (C-S), extension segment 220, that provides for a compact configuration. Extension segment 220 (points C-S) connects first curved heated section 203 with a loop segment 221. Thus, loopback optical waveguide section 205 can be considered to comprise extension segment 220 (segment C-S), loop segment 221 (segment S-T) and connection segment 222 (segment T-D). A shown in the FIG. 3, most of the segment C-S is straight, but C-S can have some curvature as long as other constraints are achieved, such as the radius of curvatures of T-D and S-T do not fall below the selected cut off value to avoid undesirable optical loss. Also, extension segment 220 (C-S) can comprise a curved portion near point C depending on the position of heater 201 since point C is positioned based on thermal region 208 and not by curvature. In this embodiment, the average radius of curvature of loop S-T is smaller than the average radius of curvature of B-C. While FIG. 3 shows loop S-T with a semicircular structure and C-S mostly straight, these conditions can be relaxed, and for the relaxed configurations, the point S can be selected at the point at which the radius of curvature becomes smaller than the average radius of curvature of segment B-C.

The use of adjacent heated waveguide sections provide for heater placement that can reduce power consumption to operate the phase shifter. Generally, reducing the separation between the waveguide sections within the thermal region increases the efficiency because it places both waveguides closer to the hottest section of the thermal region. However, reducing the separation between the waveguides generally increases the optical crosstalk between the waveguides, which can degrade the performance of the device through the introduction of noise in the optical signal carried in the waveguide. Generally, the waveguide sections are placed far enough apart to obtain acceptable low levels of crosstalk/noise. Hence the waveguide separation and, consequently the efficiency, is limited by the minimum waveguide separation permitted by the acceptable limit for optical crosstalk. For a fixed waveguide separation, the embodiment depicted in FIG. 3, reduces the optical crosstalk relative to an embodiment with adjacent linear waveguide by breaking the phase matching condition due to the curvature. Light that propagates through one straight waveguide stays in phase with light that propagates through a second straight waveguide that is equivalent in design and parallel with the first waveguide. In other words, the phase matching condition will be maintained for two waveguide that are equivalent, straight and parallel.

When the phase matching condition is maintained, optical crosstalk is greater all else being equal. Light that propagates through one curved waveguide will not stay in phase with light that propagates through a second curved waveguide that is equivalent in design and adjacent with the first waveguide. Specifically, if the adjacent waveguide sections are curved, the difference in radius of curvature results in phase misalignment as the signals transmit through the adjacent waveguide sections that naturally reduces the optical coupling leading to crosstalk. In other words, light that propagates through one curved waveguide section does not stay in phase with light that propagates through a second curved waveguide section and adjacent with the first waveguide section. Thus, the phase matching condition is not maintained for two waveguide that are equivalent apart from position, curved and adjacent. When the phase matching condition is broken, for a fixed waveguide separation, optical crosstalk is reduced. Thus, due to the reduced crosstalk at an equivalent spacing of adjacent waveguide sections, adjacent curved waveguide sections can be placed closer to each other with acceptable crosstalk/noise of a transmitted signal. The combination of the curved heated waveguide sections and the heater placements described herein provide for particularly efficient designs.

By using curved heated waveguides, as depicted in FIG. 3, for a given limit on optical crosstalk, the waveguide separation can be reduced. By configuring the waveguides with reduced separation, the embodiment depicted in FIG. 3 can have improved thermal efficiency. Furthermore, improved efficiency can be achieved by configuring the separation, sA (noted in FIGS. 4-8), between first curved heated waveguide section 203 and the second curved heated waveguide section 204 to have a constant value that is the smallest value determined by the selected optical crosstalk restriction. This configuration can be achieved by configuring the first curved heated waveguide section 203 and the second curved heated waveguide section 204 to lie along arcs of mutually concentric circles wherein the radius of the two circles differs by a value equal to waveguide separation allowed by the selected optical crosstalk restriction. Our experimental measurements with similar devices demonstrate that substantial heater efficiency improvement when sA has a value of 20 microns or less with a configuration depicted schematically in FIG. 3 in commercial grade silica glass planar lightwave circuits. Additional details related to the values of the signed curvature that can provide desirable compactness and efficiency are described below.

The positioning of the heater to simultaneously heat two adjacent waveguide sections can provide desirable energy saving since thermal conduction can be captured at least in part. The design of the heater configuration can be influenced by a range of parameters including, for example, materials of the components, layout, performance criteria, nature of the signals to be transmitted, etc. Representative configurations in a cross sectional view along line A-A of FIG. 3 are shown in FIGS. 4-8. For convenience, the basic structure in FIGS. 4-8 is referenced to the same structural features in FIG. 3 with focus on the changing of the heater. In the plane of the waveguides, the heater projection generally is curved mimicking the curvature of the heated waveguide sections. Thus, the projection of the heater in the waveguide plane has a length, width and curvature. Generally, the radius of curvature of the heater projection along the center of the width of the projection can be approximately the average of the radii of curvature of the adjacent two curved heated waveguide sections.

With a particular placement of a heater, a corresponding thermal zone (or, equivalently, heated zone) can be expected within which the waveguide is significantly heated. The thermal zone extends beyond the heater position due to thermal conduction. References to points and features relative to the thermal zone, are understood to refer to the location in the plane of the device unless explicitly indicated otherwise. The hot point refers to a point or region on the plane of the device with the highest temperature within measurement error. The heat dissipates gradually, but the boundary of the thermal zone can be specified for convenience where the temperature increase from ambient is a factor of two less than the temperature increase over ambient due to the heater at the hot point. As noted below, the edge of the thermal zone specified this way approximately indicates the region in which heating of the waveguide sections can result in energy efficiency relative to a traditional design. In embodiments of particular interest, the thermal zone extends across the width of the waveguides whether or not the heater element extends across the width of the waveguides. But the thermal zone generally does not extend too far past the edges of the waveguides to reduce the wasted thermal energy, so the heater is generally shaped to have a projection in the plane of the waveguides mimicking the shape of the heated waveguide sections, which can be curved for the several advantageous reasons described herein. Further discussion of the thermal contours is found in the co-filed TOPS application. Due to the thermal conduction, heating between the adjacent waveguides tends to provide heat to both waveguides, so placement of the heater completely or with significant portions between the waveguides can provide efficient energy use.

Figure 4:
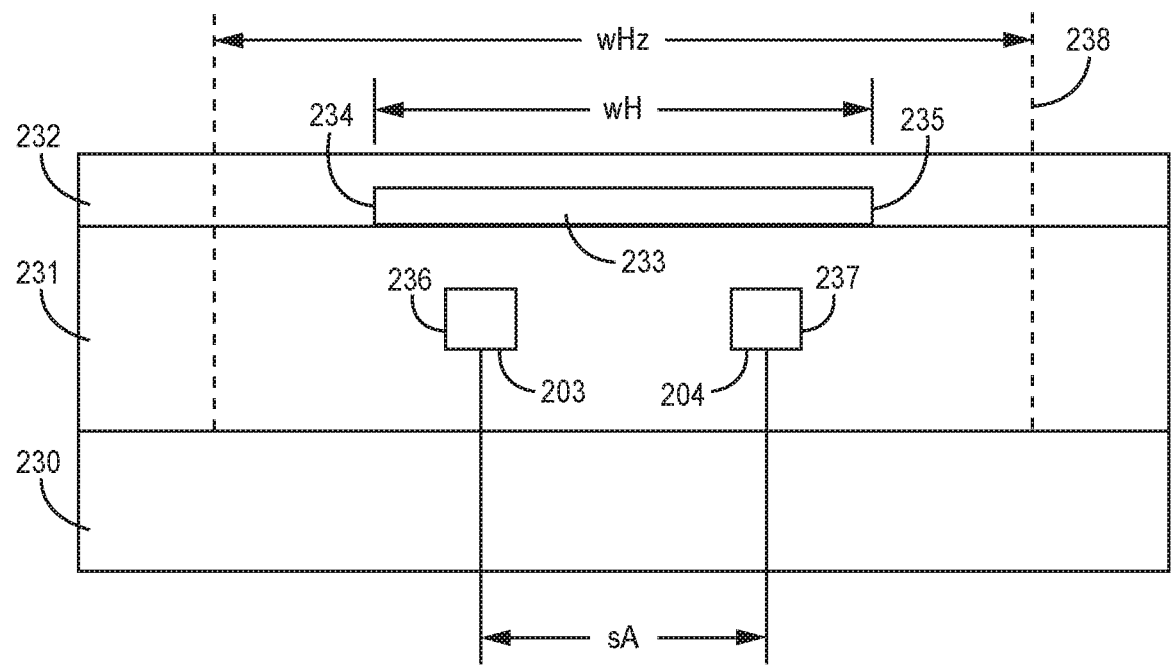
FIG. 4 is a schematic cross sectional view of the thermo-optic phase shifter in FIG. 3 taken along line A-A with a first embodiment of a heater that extends in the plane over and past the heated waveguide sections.

Referring to a sectional view in FIG. 4, phase shifter 200 (FIG. 3) comprises an optional substrate 230, cladding 231 surrounding heated waveguide sections 203, 204, and optical overcoat 232 covering heater 233. As noted above, references to waveguides and waveguide sections are referenced to the core optical material that carries most of the optical signal. As shown in FIG. 4, heater 233 has a width wH larger than the separation between adjacent heated waveguide sA, which is shown as a center to center distance. In this embodiment, with reference to the plane of the device, outer edges 234, 235 of heater 233 extend past outer edges 236, 237 of heated curved waveguide sections 203, 204, respectively, while heater 233 also extends over the space between heated waveguide sections 203, 204. Thermal zone 238 is shown in FIG. 4 extending in the plane beyond outer edges 234, 235 of heater 233 due to thermal conduction. The dashed lines marking thermal zone 238 are depicted in FIG. 4 as vertical, although thermal conduction from heater 233 would not generally be expected to follow such a configuration. However, the thermal conditions at the level within the structure of the heated waveguides is the significant reference position, so the markings of the thermal zone generally herein can be considered to be at this relevant depth within the structure. It has been discovered that further thermal efficiency can be achieved through a reduction of the heater width across the heated waveguides while maintaining desirable optical properties and control of the thermo-optic phase shift.

In use, heat from heater 233 is conducted into the waveguide cladding 231 and subsequently conducted into heated waveguide sections 203, 204. The elevated temperature of first heated waveguide section 203 introduces a phase shift onto the light that propagates through the first curved heated waveguide section relative to corresponding propagation at ambient temperature. Similarly, the elevated temperature of second curved heated waveguide section 204 introduces a phase shift onto the light that propagates through the second curved heated waveguide section relative to propagation at ambient temperature. Because loopback optical waveguide section 205 optically connects heated waveguide sections 203, 204, light that propagates through first curved heated waveguide section 203 also propagates through second curved heated waveguide section 204 and consequently, the phase shifts introduced within the active waveguide sections combine to produce a net phase shift that is approximately the sum of the two individual phase shifts. Hence, by situating first curved heated waveguide section 203 and second curved heated waveguide section 204 in close proximity, the device can use the indirect heating contribution to make the phase shifter more energy efficient. Smaller separation between the first waveguide section and the second waveguide (that is, smaller sA values) can yield greater energy efficiency of the phase shifter within optical performance constraints. In particular, as shown in FIG. 3 as well as in MZI embodiments described below, the optical waveguide passes through the thermal zone twice, once where a first curved heated waveguide section is within the thermal zone and a second instance where a second curved heated waveguide section is within the thermal zone. Because the optical waveguide passes through the thermal zone twice, the optical phase shift caused by a fixed electrical power applied to the heater is approximately double the value relative to the optical phase shift caused by an equivalent design (e.g., a design with equivalent heater and waveguide dimensions and relative positions) where the optical waveguide passes through the thermal region only once. Hence, phase shifter embodiments described herein can exhibit roughly double the efficiency relative to a similar design where the optical waveguide passes through the thermal region only once. Correspondingly, the thermal zone in the plane of the waveguides can have a boundary where the temperature increase over background drops to one half of the highest temperature increase over background (hot point) in the plane.

Figure 5:
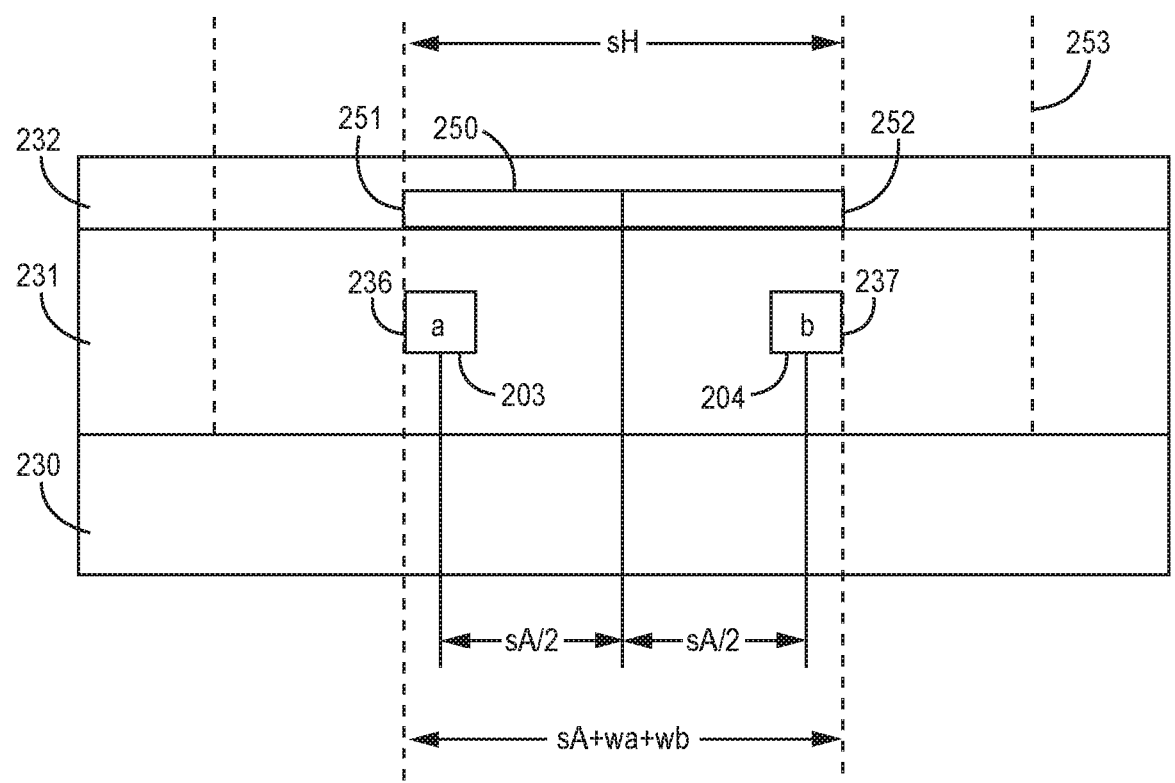
FIG. 5 is a schematic cross sectional view of the thermo-optic phase shifter of FIG. 3 taken along line A-A with an alternative embodiment of a heater, in which the heater is over both a first waveguide and a second waveguide with aligned outer edges.
Figure 6:
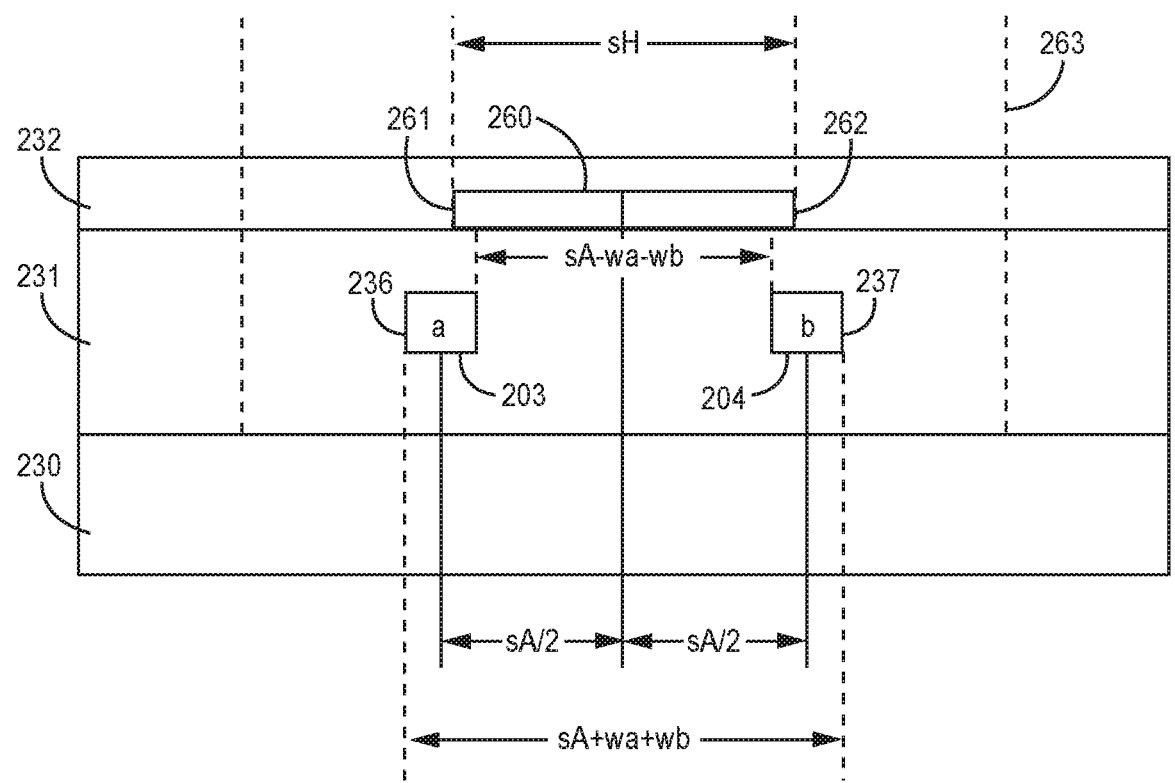
FIG. 6 is a schematic cross sectional view of the thermo-optic phase shifter of FIG. 3 taken along line A-A with a further alternative embodiment of a heater, in which the heater partially extends over both a first heated waveguide and a second heated waveguide.
Figure 7:
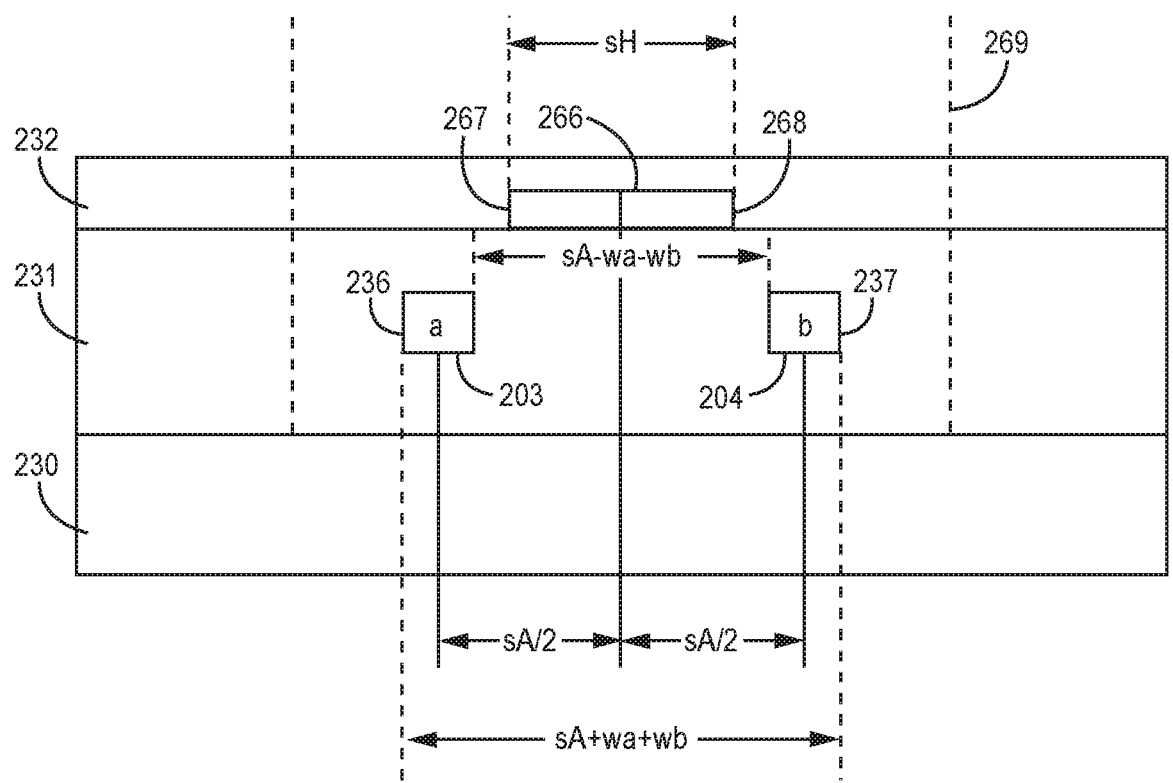
FIG. 7 is a schematic cross sectional view of the thermo-optic phase shifter of FIG. 3 taken along line A-A with another alternative embodiment of a heater, in which the heater along the plane of the device is between a first heated waveguide and a second heated waveguide.
Figure 8:
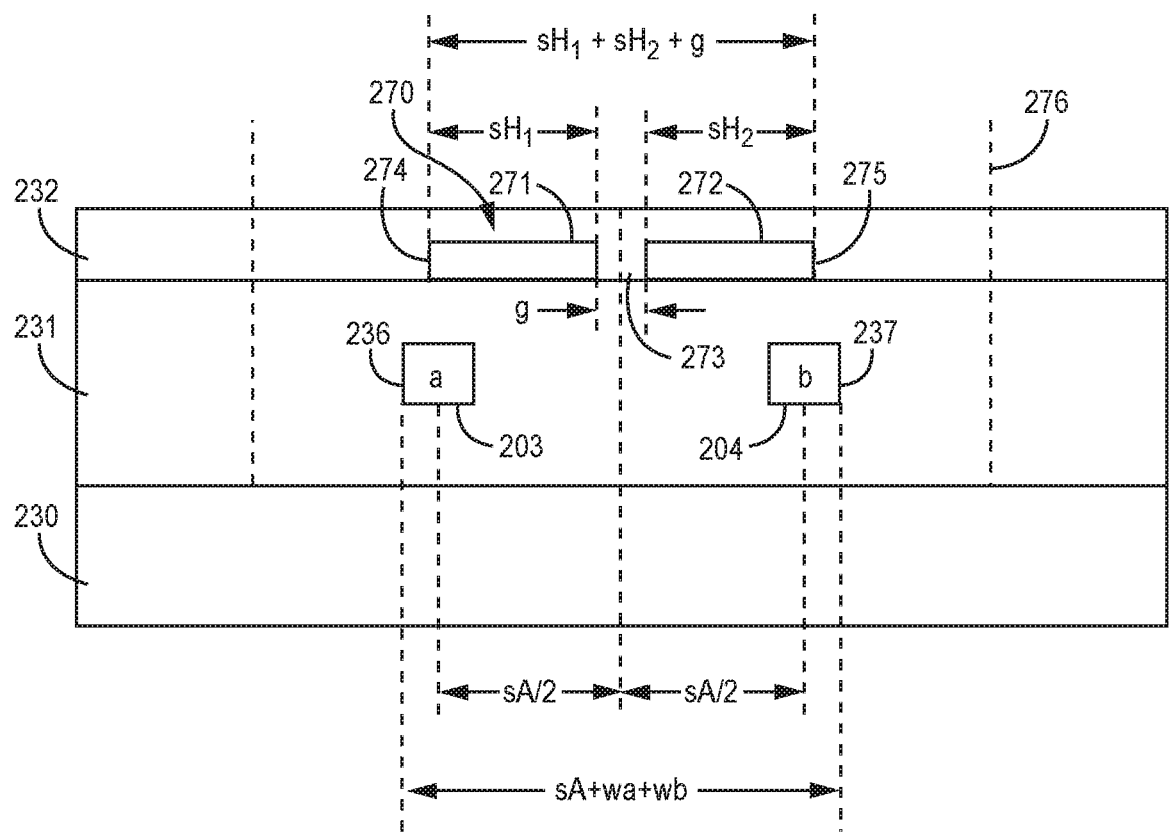
FIG. 8 is a schematic cross sectional view of the thermo-optic phase shifter of FIG. 3 taken along line A-A with a heater having two heating elements separated by a gap that is between the first heater waveguide section and the second heated waveguide section, in which each heater partially covers a portion of a respective heated waveguide section along the plane of the device.

Representative heater configurations with reduced heater widths are shown in FIGS. 5-8. FIGS. 5-8 depict heater embodiments that are positioned with respect to the corresponding waveguide sections in an approximately symmetrical fashion to heat the two waveguide roughly equally, although such symmetrical configurations may not be needed to achieve desirable energy efficiencies and asymmetrical configurations are contemplated. With respect to a more energy efficient heater configuration, FIG. 5 depicts a heater extending in the plane from the outer edges of heated waveguide sections 203, 204 spanning the region between the waveguides. FIGS. 6-7 depict heaters that are sequentially smaller while spanning the center of the space between the heated waveguide sections, and FIG. 8 depicts the splitting of the heater into two heater elements with a gap in the heater in the space between the heated waveguide sections. These embodiments are next discussed in more detail.

Referring to FIG. 5, heater 250 has a width in the plane of the device with outer edges 251, 252 approximately aligned with the outer edges 236, 237 of heated waveguide sections 203, 204. Thermal zone 253 is shown to be somewhat smaller than thermal zone 238 of FIG. 4. A center line is drawn in the heater just for visualization purposes. FIG. 5 shows the spacing between the centers of heated waveguide sections 203, 204 as sA. The relationships relating to the heater width can be expressed as sH=sA+wa+wb, where wa and wb are half widths of the respective heated waveguide sections.

Referring to FIG. 6, heater 260 is positioned with outer edges that overlap with heated waveguide sections 203, 204 in the plane of the structure. Outer edges 261, 262 of heater 260 are positioned toward the center relative to the outer edges 236, 237 of heated waveguide sections 203, 204. Thermal zone 263 extends laterally somewhat less than thermal zone 253 of FIG. 5. In this approximately symmetric structure, sA−wa−wb<sH<sA+wa+wb. In an additional heater embodiment (see figure in TOPS application), sH=sA−wa−wb, or in other words, the outer edges of the heater in the plane are approximately aligned with the inner edges of heated waveguide sections 203, 204. FIG. 7 depicts a heater embodiment in which the width of heater 266 is less than the width between heated waveguide sections 203, 204. Thus, in the plane of the structure, heater 266 is between curved heated waveguide sections 203, 204 with outer edges 267, 268 within inner edges of heated waveguide sections 203, 204, and heater 266 does not overlap the waveguides along the plane. So for the heater embodiment in FIG. 7, sH<sA−wa−wb. Thermal zone 269 is depicted as being correspondingly somewhat smaller. The heaters in FIGS. 5-7 are depicted below optional overcoat 232 and on top of cladding 231, which is shown on optional substrate 230. Together FIGS. 5-7 depict various widths of the heater that represent possible configurations from sH=sA+wa+wb to sH<sA−wa−wb. Additional embodiments of heater widths include other values of sH<sA+wa+wb in addition to the depicted configurations, and the design selection of the specific values can depend on the range of additional details summarized generally herein. In a commercial device design, various considerations can enter into a design selection including optical performance, layout in the PLC, energy efficiency, materials, processing considerations, and other specific performance issues. Some ranges of suitable values for silica based optical devices are provided below.

The effective shrinking of the heater width (and generally area) relative to the embodiment of FIG. 5 through the division into two heater elements is depicted in FIG. 8. Referring to FIG. 8, a heater 270 is parsed into heater elements 271, 272 with a gap 273 separating the heater elements on the surface of optional overcoat 232. In this embodiment, outer edge 274 of heater element 271 is positioned over first heated waveguide section 203 in the plane of the structure, and outer edge 275 of heater element 272 is positioned over second heated waveguide section 204. Gap 273 represents a decrease in the area of heater 270 relative to a corresponding heater without the gap separating the heater into two heater elements. A corresponding thermal zone 276 is noted in FIG. 8. The introduction of gap 273 generally changes the thermal distribution of the device in use with the expectation of some thermal conduction from heater element 271 to second heated waveguide section 204 and from heater element 272 to first heated waveguide section 203, which can contribute to the energy efficiencies of the thermo-optic phase shifter.

FIG. 8 displays a heater embodiment that reduces the width of heater material across the plane of the structure perpendicular to the optical path defined by the waveguide at least in part through the introduction of a center gap between two heater elements. This embodiment of the heater can provide alternative thermal distributions relative to the heater embodiments in FIGS. 5-7 that also reduce their widths relative to the heater embodiment in FIG. 4. In addition to the embodiment of FIG. 8, the size of the gap can be adjusted, and the outer edges of the heater elements can be selected to achieve desired thermal response while achieving desirable reduction of energy use. In general, the selection of a particular design can depend on various design parameters, optical performance, expectation of operation conditions, processing considerations and potentially additional factors. Generally, selected designs can provide efficient thermal operation for the thermo-optic phase shifter.

Figure 9:
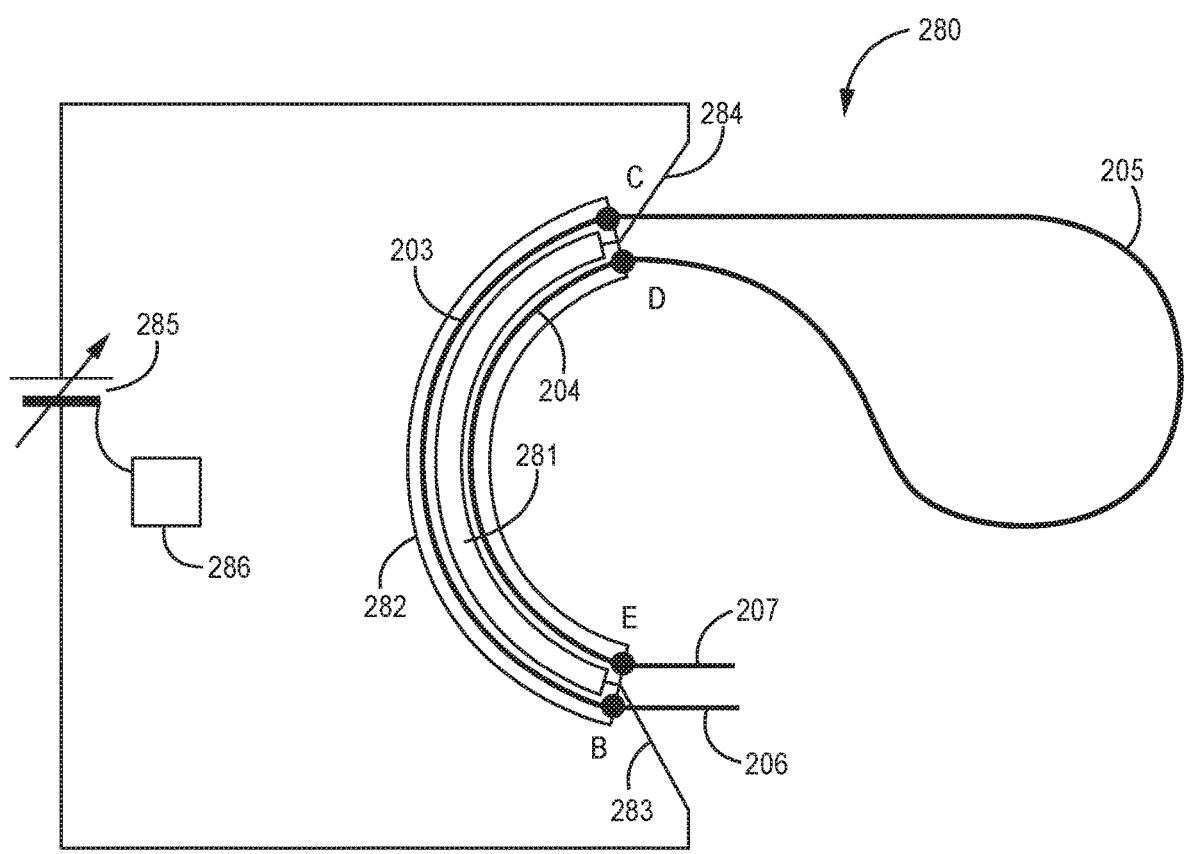
FIG. 9 is a schematic top view of the thermo-optic phase shifter of FIG. 3 depicting a first configuration of electrical interconnects to power the heater.

FIG. 9 is a schematic top view of a thermo-optic phase shifter 280 with a configuration of electrical interconnects to power a heater 281 with a thermal zone 282 depicted such as may be used for the embodiments in FIGS. 4-7 discussed above. For convenience the optical components are associated with the corresponding optical components of the general phase shifter of FIG. 3, which are also used for FIGS. 4-7. As shown, at or near each end of heater 281 is connected with electrical connections 283, 284 to respective terminals of a voltage source 285, which is connected to controller 286. Other arrangements of electrical connections are possible as will be readily recognized by a person of ordinary skill in the art. In one such alternative embodiment, a connection near the center of heater 281 is connected to one pole of a power source while connected at or near the ends of heater 281 are connected to the other pole of the power source. Controller 286 for this embodiment and all other embodiments described herein can be a digital processor or the like, and can be considered present whether or not shown in a specific figure.

Figure 10:
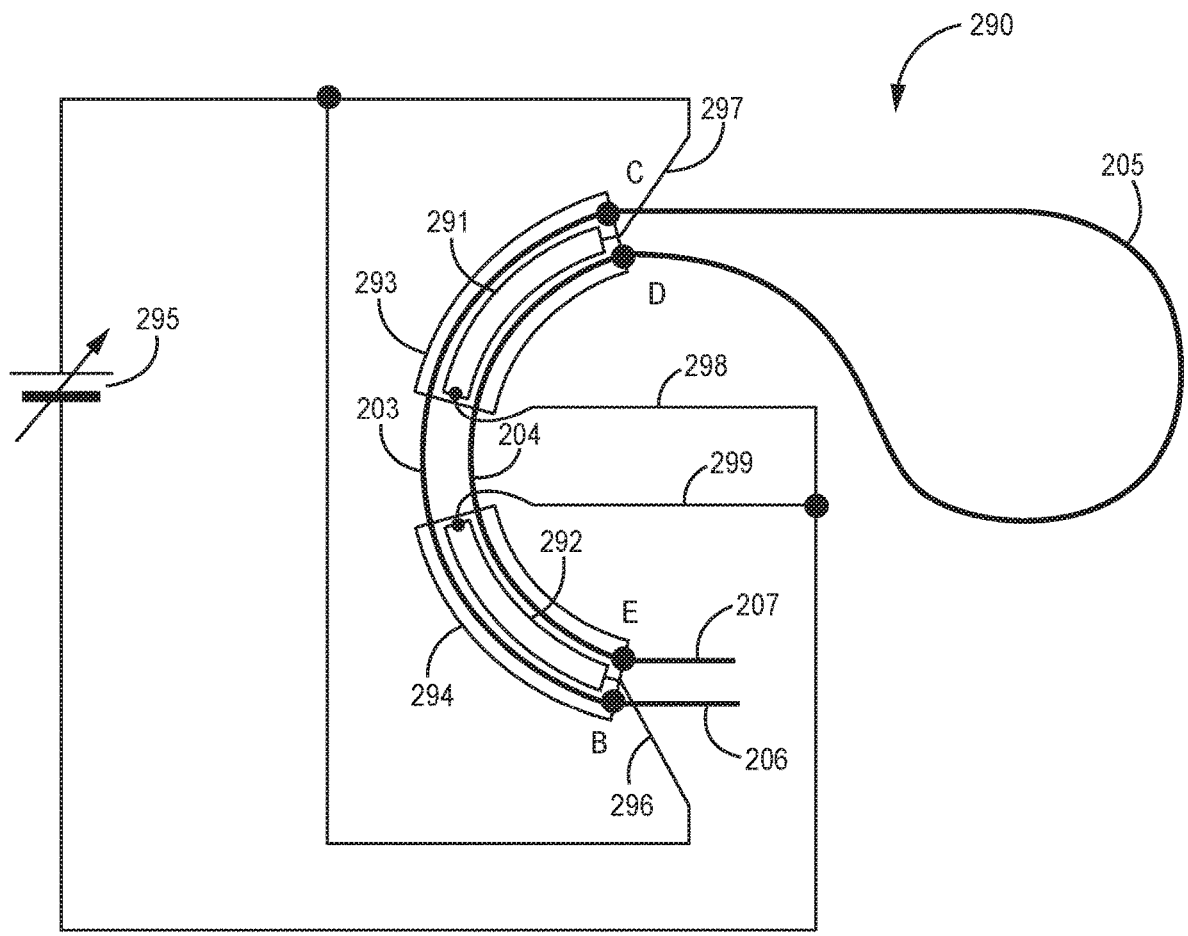
FIG. 10 is a schematic top view of the thermo-optic phase shifter of FIG. 3 with a heater having two heating elements divided along the arc of the curved heated waveguide sections depicting a configuration of electrical interconnects to power the two heating elements.

In additional or alternative embodiments, the heater or heaters can be segmented along the length of the adjacent waveguide sections. Such an embodiment of the thermo-optic phase shifter is depicted in FIG. 10 again with the optical components, i.e., waveguide, of FIG. 3. FIG. 10 is a schematic top view of a phase shifter 290 with two heater elements 291, 292 separated on the arc of first curved heated waveguide section 203 and second curved heated waveguide section 204 and with a configuration of electrical interconnects to power heater elements 291, 292. Heater elements 291, 292 provide corresponding thermal zones 293, 294. This configuration of heater elements divides first heated optical waveguide section 203 into a first heated segment, a second heated segment and connecting segment, and similarly second curved heated waveguide section 204 into first heated segment, a second heated segment, and a connecting segment. The first heated segments of first curved heated waveguide section 203 and second curved heated waveguide section 204 are within first thermal zone 293, and the second heated segments of first curved heated waveguide section 203 and second curved heated waveguide section 204 are within second thermal zone 294.

Referring to FIG. 10, outside ends of heater elements 291, 292 are connected to the positive side of a voltage source 295 respectively with connections 296, 297, and inside ends of heater elements 291, 292 are connected to negative side of voltage source 295, respectively, with connections 298, 299. In this configuration, a gap is introduced into the heater at a location midway between the ends. Electrical connection is completed for both heater segments by providing electrical connection from the negative terminal of the voltage source to the heater elements at or near each side of the electrically isolating gap. In one alternative configuration, a separate and independent voltage source could be used for each heater element. A wide variety of other divisions of the heater and reasonable arrangements of heater segments will be apparent to those practiced in the art based on the teachings herein.

Figure 11:
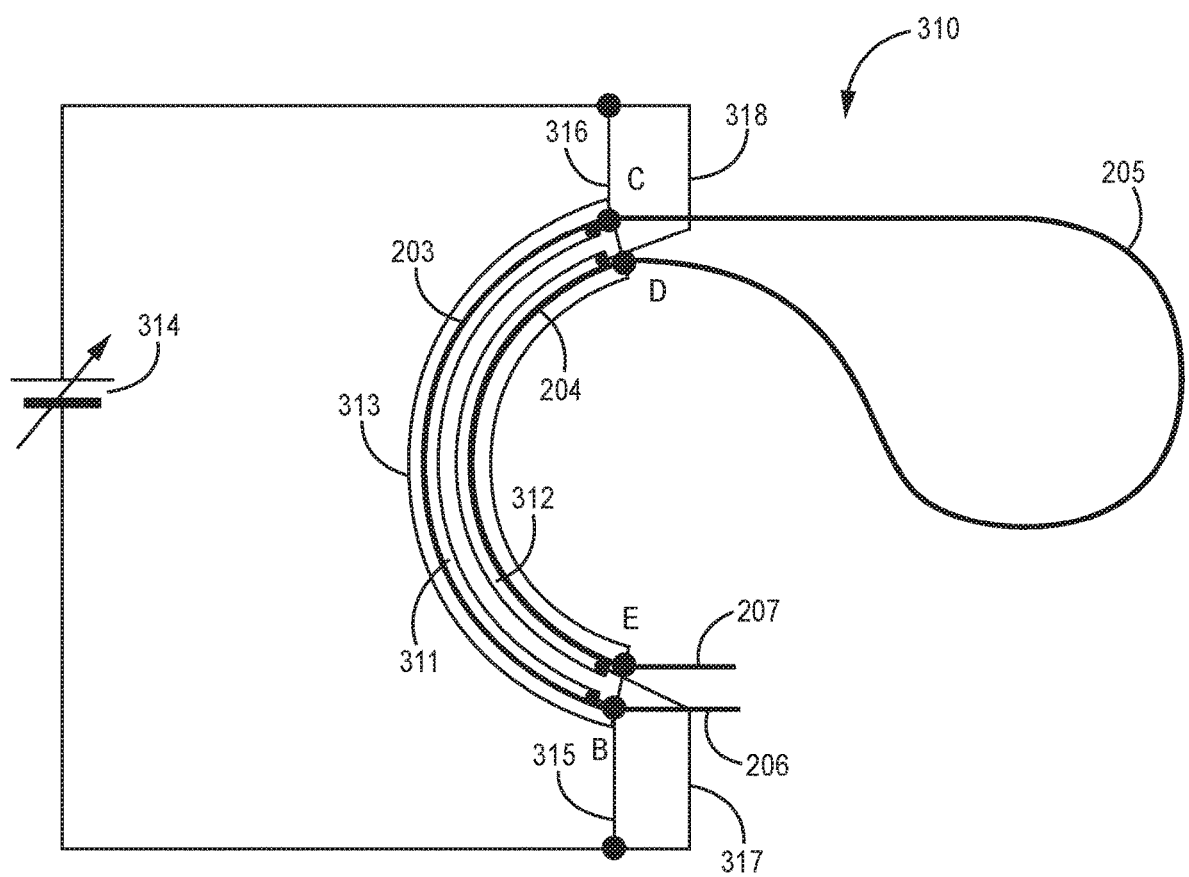
FIG. 11 is a schematic top view of the thermo-optic phase shifter of FIG. 3 with a heater having two heating elements divided along the width of the waveguide path of the curved heated waveguide sections, such as shown in FIG. 8, depicting a configuration of electrical interconnects to power the two heating elements.

FIG. 11 shows a schematic top view of a phase shifter with electrical connections for a heater with two heater elements separated from each other along the width relative to two adjacent waveguide sections, such as those shown in the sectional view of FIG. 8. Similar electrical connections can be used for other similar embodiments of the phase shifter. Referring to FIG. 11, thermo-optic phase shifter 310 is again depicted on the optical waveguide platform of FIG. 3 for convenience. The heater for phase shifter 310 has heater elements 311, 312 that provide a thermal zone 313 that covers first curved heated waveguide section 203, second curved heated waveguide section 204 and heater elements 311, 312. As shown, each heater element 311, 312 is independently connected to a common voltage source 314 through connections 315 and 316 to heater element 311 and connections 317, 318 to heater element 312. Other arrangements are possible as will be recognized by a person of ordinary skill in the art based on the teachings herein. In one alternative configuration, a separate and independent voltage source could be used for each heater element. In a second alternative configuration, the heaters may be electrically connected to each other at each end such that the electrical connections that join the heaters are integrated within the PLC. Heater elements divided along their width as shown in FIGS. 8 and 11 can also be further divided along the arc as shown in FIG. 10, with heater elements of FIG. 8 or 11 divided along the arc for each waveguide, that would correspondingly result in four heater elements with further divisions along the arc possible. While the terminology is used in which heater elements associated with one phase shifter are collectively referred to as a single heater, it will be recognized that this is merely semantics, and that one or groups of heater elements can be effectively separate heaters with separate control of current flow to generate heat from the particular elements.

A variable voltage source is depicted in FIGS. 9-11 as the source of electrical power used to drive the heaters; however, those practiced in the art will understand that a variety of other options are possible, including but not limited to a variable current source and a pulse width modulation circuit.

In general, the separation, sA, between adjacent points of the active waveguides may vary along the length of the device; however, in some embodiments, sA maintains an approximately constant value along the device. As described above, if the waveguides approach too closely, optical performance can suffer, and if the waveguides separate too far, thermal efficiencies can be reduced. For example, with curved heated waveguide sections, the first heated waveguide section may be aligned to the arc of a circle with radius $R_1$ and centered at point P, while the second heated waveguide section may be aligned to the arc of a circle with radius $R_2$ and centered at point P and $R_1$ is greater than $R_2$ by a value that is equal to sA. In this example, $R_2$ can be selected to have a value that is large enough to prevent substantial bend loss (that is, the loss associated with light propagating around a bend). For example, for a waveguide that comprises a channel waveguide with a 1.8% index contrast, a typical application may require that $R_2$ be greater or equal to about 1 mm. Of course, in the structure of FIG. 3, the average radius $R_L$ of loop segment 221 is smaller than the radius $R_2$, so that the bend loss concern can be appropriately referenced to $R_L$.

While the structure in the previous paragraph may be a particularly desirable design, reasonable performance can be achieved with a relaxation of these conditions, such as having somewhat non-circular waveguide segments. Also, the spacing sA may not be approximately constant, but can range from the average sA±20% of the average. A person or ordinary skill in the art will recognize that additional ranges within the present ranges are contemplated and are within the present disclosure. If sA is referenced without further comment, sA refers to the average value.

The selection of the value of sA can avoid undesirable optical coupling of the active waveguides if they are situated sufficiently close to each, that is, if sA is undesirably small. Substantial optical coupling can result in undesired optical performance. Herein, sW refers to a selected cut off value (lowest value) for the center to center waveguide separation, sA, above which sufficiently small optical coupling between waveguides provides acceptable optical performance. The selection of the value of sW depends on the details of the waveguide construction, on the details of the values of the index of refraction of the various materials that are used, and on the tolerance of the considered application towards the performance degradation related to optical coupling between optical waveguides. Furthermore, one of ordinary skill in the art will be able to select the value of sW, either from experience, experimental measurements and/or by numerical simulations, applicable for their intended application and for the optical waveguides for the particular application.

Consequently, in some embodiments, the value of sA can be selected to be approximately the smallest value consistent with selected restrictions associated within fabrication limits and with spatial selected cutoff spacing on acceptable optical coupling. The selection of the smallest value of sA for desired performance depends on the details of the waveguide construction, on the details of the values of the index of refraction of the various materials that are used, and on the tolerance of the considered application towards the performance degradation related to optical coupling between optical waveguides, which in some embodiments can be selected to be no more than about −27 dB. As known in the art, efficient optical coupling between adjacent waveguides requires modes of the respective waveguides to remain in phase with each other as they propagate; i.e., efficient coupling involves the phase matching condition to be satisfied. Adjacent curved waveguides with equal widths do not satisfy the phase matching condition, hence, the curved waveguide depicted in FIG. 3 exhibits less efficient optical coupling than straight waveguide for the same value of sA, which is a desirable feature of the curved waveguides. Consequently, the waveguide configuration with curved waveguides allows for a smaller value of sA and consequently allows for improved phase shifting energy efficiency relative to an embodiment straight commonly heated waveguide sections. Our experimental measurements on the thermo-optic phase shifter similar to FIG. 3 having channel waveguides with a 1.8% index contrast relative to the cladding material indicates that straight waveguide sections may be situated such that sA has a value of at least about 12 microns to avoid substantial performance degradation associated with optical coupling and curved waveguide sections may be situated such that sA has a value of at least about 10 microns to avoid substantial performance degradation, although smaller separations may still provide performance degradation within an acceptable range for many applications. Our experimental measurements with similar devices suggest that substantial heater efficiency improvement are expected when sA has a value of roughly 30 microns or less. Consequently, desirable results can be obtained with waveguide with 1.8% index contrast has sA with the range from 10 microns to 30 microns and in further embodiments from about 10 microns to about 25 microns. A person of ordinary skill in the art will recognize that additional ranges of sA within the explicit ranges are contemplated and are in the present disclosure. Phase shifters were formed with silica glass with a 1.8% index of refraction difference with several values of sA as well as a traditional design. The traditional design exhibited an energy efficiency of 0.62 degrees/mW. Two different values of sA (20 microns or 12 microns) were used to obtain energy efficiencies of was 0.98 degrees/mW or 1.12 degrees/mW, respectively, corresponding to efficiency improvements of 1.58 or 1.81. Avoidance of optical coupling between adjacent waveguides restricts the efficiency improvement to be less than the factor of 2 theoretical limit. Furthermore, the curved heated waveguide sections of the inventive thermo-optic phase shifter reduce the footprint of the device allowing for more compact implementations.

Figure 12:
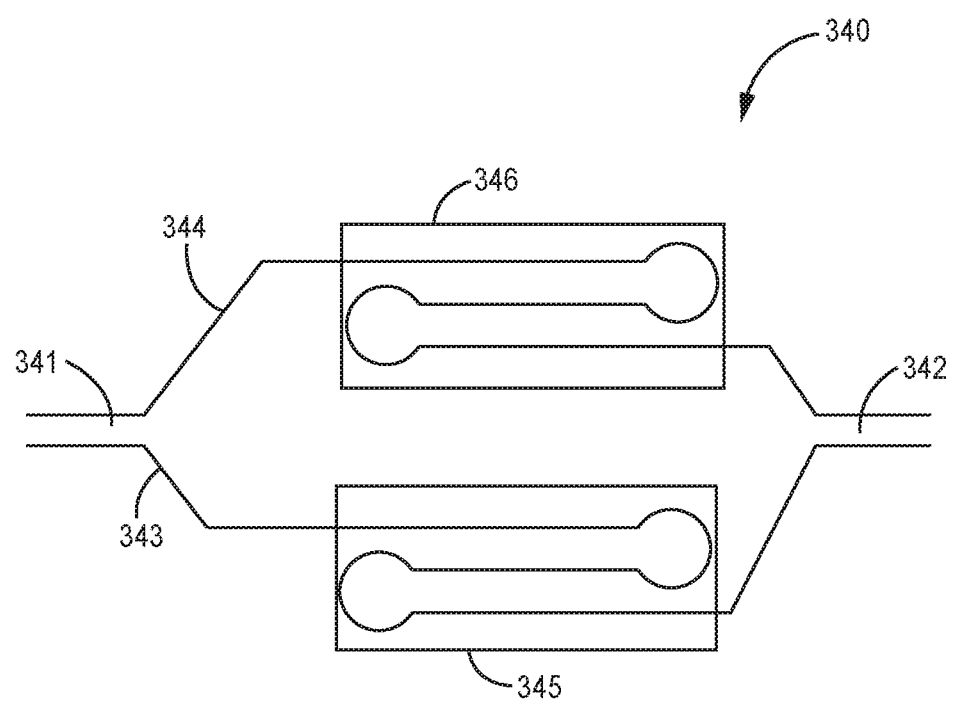
FIG. 12 is a top view of a prior art MZI in which each MZI arm has a thermo-optic phase shifter in which three adjacent sections of waveguide are simultaneously heated with a single heater.

An attempt to capture some lost heat to form a more energy efficient thermo-optic phase shifters for an MZI is described in U.S. Pat. No. 8,103,136 to Chen et al. (hereinafter Chen), entitled "Thermo-Optic Devices Providing Thermal Recirculation," incorporated herein by reference. Referring to FIG. 12, an MZI 340 is shown that corresponds roughly to FIG. 5 of Chen. MZI 340 comprises directional couplers 341, 342, waveguide arms 343, 344, and two thermo-optic devices 345, 346. Each waveguide arm 343, 344 have two loopback sections to form folded optical paths with several laterally displaced waveguide sections associated with each thermo-optic device 345, 346. Chen does not recognize the significant efficiencies with respect to layout and energy use from using curved commonly heated adjacent waveguide sections as shown in FIG. 3 herein, or the improved placement of the heaters, such as shown in FIGS. 5-8 herein, or the significant size advantages from intertwining the two MZI arms. The intertwining of the MZI arms is discussed in the following.

While the MZI layout in FIG. 2 provides a relatively compact structure for each MZI arm with reduced energy use through thermal efficiencies, each arm necessarily occupies a significant area due to constraints necessitated by the radius of curvature of the waveguide and the overall device is roughly twice the size of the two thermo-optic phase shifters. It has been discovered that the geometry of the overall structure of a phase shifter in FIG. 3 can be adapted for overlapping of the areas occupied by each MZI arm in a partially reciprocally nested (intertwined) configuration so that the entire MZI structure can adopt the energy conserving structure of the MZI arms with significantly less than double the area occupied by each MZI arm. The corresponding layout of each arm schematic, without intertwining but allowing intertwining, shown in FIG. 13, while schematically showing relative locations of various segments with proportions that are modified from real proportions to aid in the clarity of the perspective.

Figure 13:
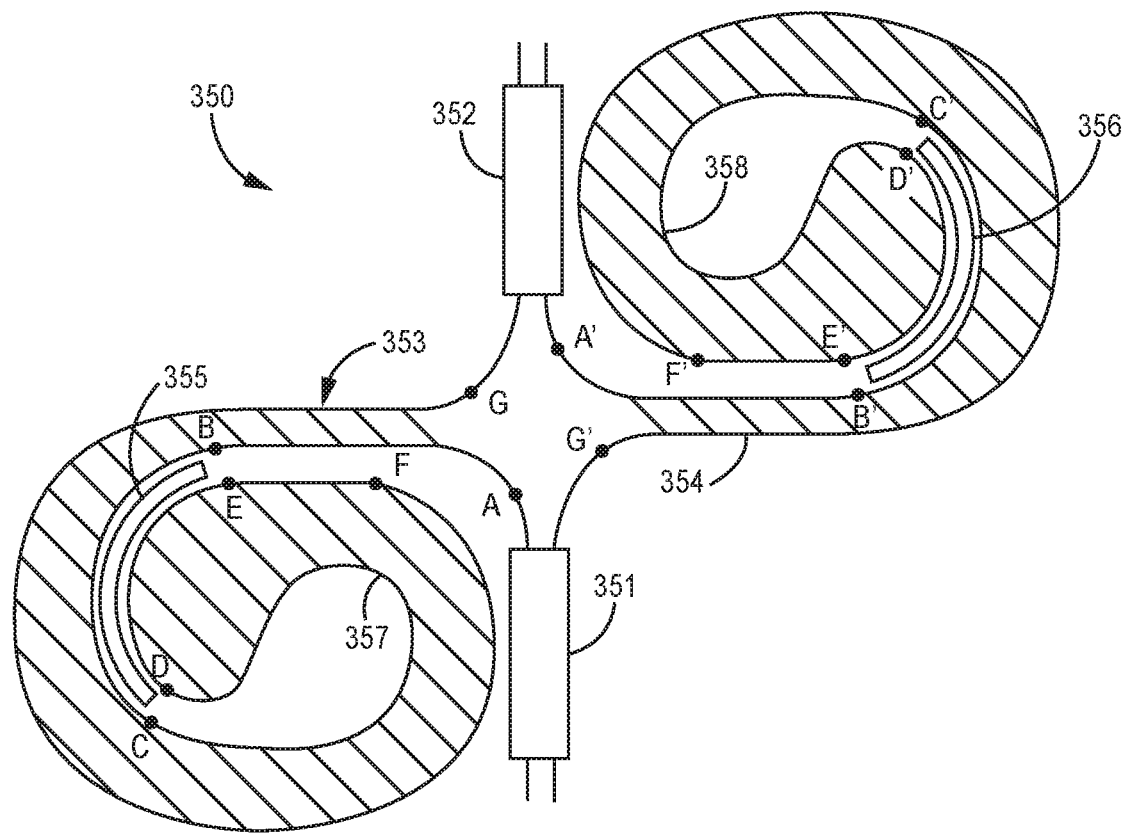
FIG. 13 is a schematic top view of an MZI in which the energy efficient phase shifters of FIG. 2 are reconfigured to provide an open accessible space that provides for intertwining of the MZI arms through the use of the open accessible space.

Referring to FIG. 13, MZI 350 comprises input coupler 351, output coupler 352, first MZI arm 353, second MZI arm 354, a first phase shifter/heater 355 on first MZI arm 353 and an optional second phase shifter/heater 356 on second MZI arm 354. Waveguide loops 357, 358 connected oppositely oriented sections of heated waveguides of first MZI arm 353 and second MZI arm 354, respectively. In a comparison of the phase shifters of FIG. 13 with those of FIGS. 2 and 3, the curvatures are reversed relative to the waveguides connecting with an adjacent couple/splitter which then flips the heater position relative to the configuration in FIG. 2. These changes in layout result in an open, accessible interior space marked with hashed lines in FIG. 13. The open interior space provides for the placement of a portion of the other MZI arm within this space for a nested layout, and vice versa. The corresponding intertwined layout based on the MZI in FIG. 13 is described in detail below, and in the intertwined layout, the two MZI arms occupy a space significantly smaller than twice the space of a single MZI arm. This conceptual framework of folding an MZI arm to simultaneously take advantage of heater placement to heat two adjacent waveguide arms and forming an open accessible space that can be effectively used for other waveguides is completely absent from Chen, which maintains distinct areas in the plane of the device for each waveguide arm.

The nominal physical paths of the waveguides in FIG. 13 are parameterized with letters similar to FIG. 3 with the addition of segments F-G and differences in the structure can be referenced to these points. A comparison of the parameterization can further clarify some distinctions. Segments A-B (A'-B') are qualitatively equivalent between the two embodiments. However, the sign of the curvature of B-C is opposite to the sign of the curvature of B'-C'. Likewise, the sign of the curvature of C-D is opposite to the sign of the curvature of C'-D' and the sign of the curvature of D-E is opposite to the sign of the curvature of D'-E'. These changes in curvature result in point F (F') not being particularly close to connecting with the corresponding coupler. In the intertwining configurations below, this relative placement of structural element is ameliorated to some degree by moving the couplers out of a linear configuration, which (linear configuration) may be suitable for a conventional MZI design but not necessarily desirable for the improved designs herein. In FIG. 13, F-G (F'-G') corresponds with a spiraling waveguide that provides for connection of the waveguide from point F (F') to the respective coupler. Movement of the couplers away from the linear configuration is also significant for consistency with the formation of the intertwined structure. Referring to FIG. 13, the two arms can be superimposed with the loop of one arm fitting into the open area adjacent the curved heated sections of the other arm. The portions of the waveguide arms connecting to the respective couplers are moved out of each other's way.

The intertwined configuration is discussed in detail in the following. First, a few additional observations can be useful. Referring to FIG. 3, with a linear waveguide extension from point F, the smallest distance between such a linear extension and loop segment 221 measured waveguide center to waveguide center is $R_2-R_L-sA$. This distance is used in the entwined structure to open the interior space for the placement of a loop portion of the other waveguide arm.

Figure 14:
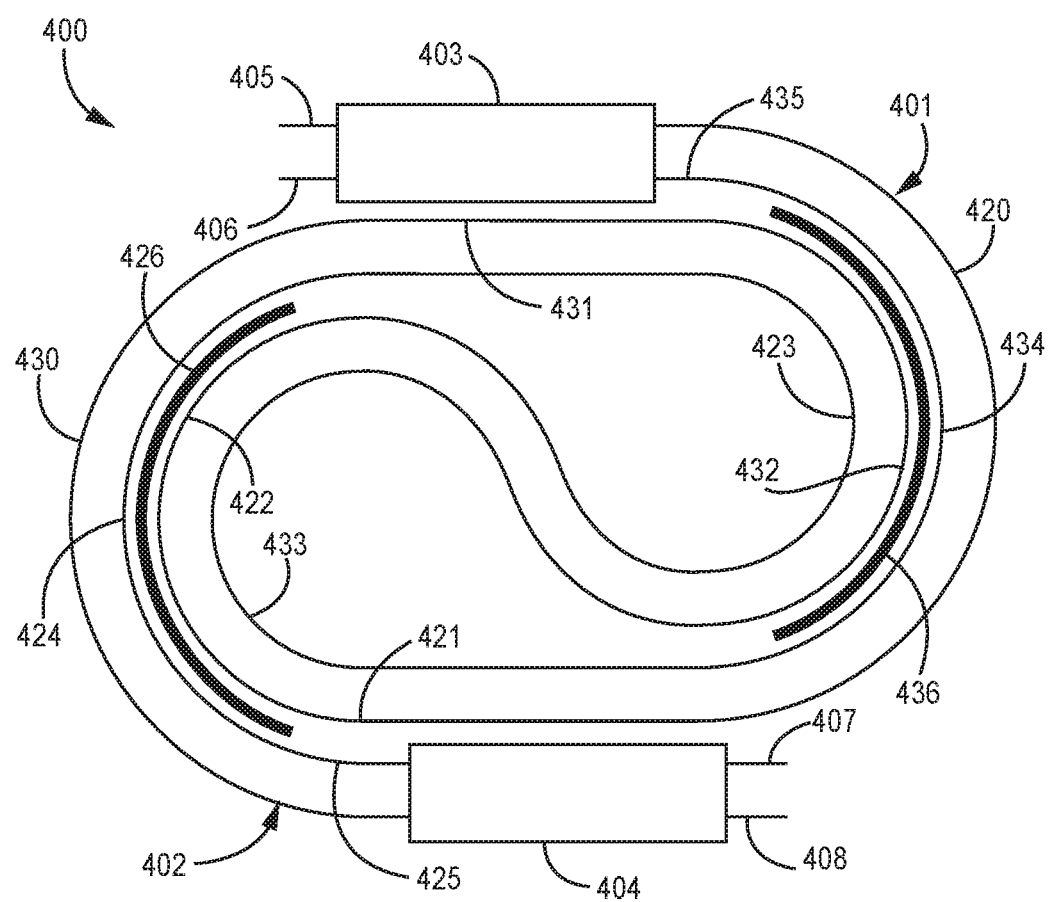
FIG. 14 is a schematic top view of an MZI with phase shifters on respective arms of the MZI in which the phase shifters are rolled together in a compact format without significant optical or thermal interference between the respective arms with illustrated portions including the input coupler, the two MZI arms, and the output coupler.
Figure 15:
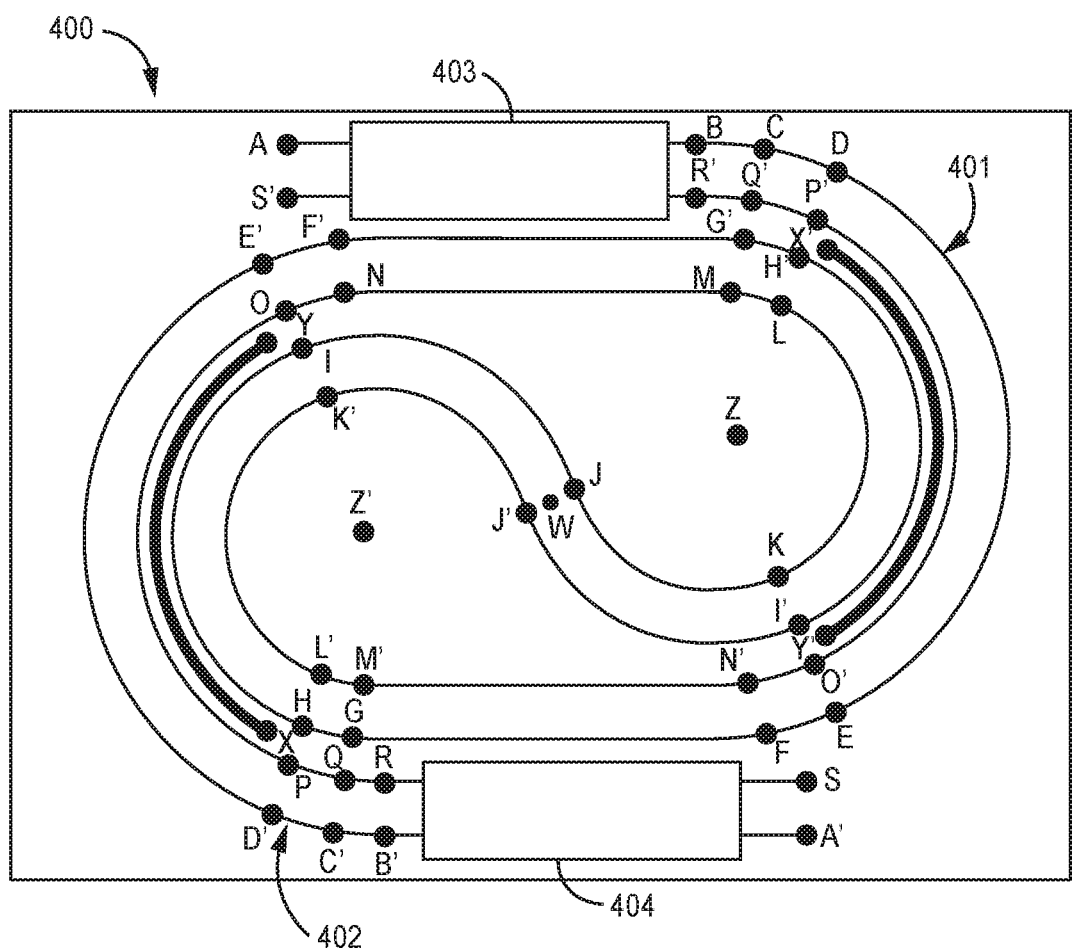
FIG. 15 is a schematic top view of the MZI of FIG. 14 with the paths of the waveguide of each MZI arm parameterized to provide for a convenient description of features of the waveguides.

Referring to FIG. 14, an MZI is shown with intertwined arms, and a parameterized version of the waveguides is discussed with more details in the context of FIG. 15 following a more general discussion of FIG. 14. As shown in the layout schematic of FIG. 14, MZI 400 comprises a first MZI arm 401 with a phase shifter that occupies substantially the same overall location on the PLC as a second MZI arm 402 with a phase shifter. MZI 400 further comprises optical coupler/splitter (input coupler) 403, optical coupler/splitter (output coupler) 404, optical inputs 405, optionally 406 and optical outputs 407, optionally 408. First MZI arm 401 referencing broad divisions (further refinement described with respect to FIG. 15) comprises outer arc 420, waveguide extension 421, inner heated arc 422, loopback waveguide section 423, outer heated arc 424, connector 425 and heater 426. Similarly, second MZI arm 402 referencing broader divisions (further refinement described with respect to FIG. 15) comprises outer arc 430, waveguide extension 431, inner heated arc 432, loopback waveguide section 433, outer heated arc 434, connector 435 and heater 436.

Relative to the structures of the phase shifters in FIG. 3, MZI arms 401, 402 in FIG. 14 have the extra outer arcs 420, 430 that provide for the two MZI arms to be rolled together in the compact configuration in FIG. 14 with the lateral shift of the coupler/splitters. With this configuration, the area of the resulting PLC occupied by the pair is phase shifters, is roughly the same area occupied by an individual phase shifter. The reductions in size with the intertwined MZI arms can be particularly advantageous for material systems requiring a bending radius that is larger than 500 microns, such as material systems with an index of refraction contrast below 3%, although the proportional reduction is significant for any material system. Thus, the MZI design in FIG. 14 can achieve desirable energy efficiencies along with significant device size reduction relative to non-intertwining designs.

An extensive parameterization of each waveguide of the MZI in FIG. 14 is depicted in FIG. 15. Letters A-S (A'-S' for other waveguide arm) mark the position along the waveguide from one end to the other. MZI 400 comprises input coupler 403 having at least one input port A (405), a first output port B, and a second output port R'. Input coupler 403 may be a Y-branch splitter, described further below, having only one input port A and having two output ports B and R'.

Alternatively, input coupler 403 may be a 2×2 coupler having two input ports A and S' and having output ports B and R', as shown in FIG. 15. MZI 400 comprises output coupler 404 having at least one output port A' and having two input ports B' and R. Output coupler 404 may be a Y-branch combiner having only one output port A' and having two input ports B' and R. Alternatively, output coupler 404 may be a 2×2 coupler having two output ports A' and S and having two input ports B' and R, as shown in FIG. 15.

MZI 400 further comprises a first arm 401 comprising a waveguide BR that optically couples first output port B of input coupler 403 to the first input port R of output coupler 404. The optical waveguide denoted as BR can be equivalently denoted as RB. MZI 400 further comprises a second arm 402 comprising waveguide R'B' that optically couples first output port R' of input coupler 403 to the second input port B' of output coupler 404. The optical waveguide denoted by R'B' may be equivalently denoted as B'R'. MZI 400 further comprises a first heater (426) extending between points X and Y, which may be referred to herein as heater XY. Optionally, MZI 400 may comprise a second heater (436) extending between points X' and Y', which may be referred to herein as heater X' Y'. Heaters XY and X'Y' can have a selected configuration, such as those shown in the context of FIGS. 4-8 above.

First arm BR comprises a multitude of waveguide segments parameterizing the optical path along the waveguide and denoted in sequence as BC, CD, DE, EF, GH, HI, LI, JK, KL, LM, NO, OP, PQ, and QR, such that each segment is optically connected to the next optical segment in the sequence. Similarly, second arm B'R' comprises a multitude of waveguide segments parameterizing the optical path along the waveguide and denoted in sequence as B'C', C'D', D'E', E'F', G'H', H'I', I'J', J'K', K'L', L'M', N'O', O'P', P'Q', and Q'R', such that each segment is optically connected to the next optical segment in the sequence.

In one embodiment, MZI 400 is rotationally symmetric such that the MZI is invariant under a 180 degree rotation about point W. In particular, in this embodiment, when rotated by 180 degrees about point W, the first arm (401) BR would coincide with second arm (402) B'R'. Furthermore, in this rotationally symmetric embodiment, each of the segments BC, CD, DE, EF, FG, GH, HI, IJ, JK, KL, LM, MN, NO, OP, PQ, and QR would coincide with segments B'C', C'D', D'E', E'F', F'G', G'H', H'I', I'J', J'K', K'L', L'M', M'N', N'O', O'P', P'Q', and Q'R', respectively.

When heated, first heater (426) XY causes an increase in the temperature of waveguide segment HI and waveguide segment OP that is substantially greater than the increase in temperature of waveguide segment D'E' and waveguide segment K'L'. In other words, when heated, the first heater causes the average temperature of segments HI and OP to be greater than the average temperature of segments D'E' and K'L'. The difference in average temperatures is herein referred to as the relative temperature difference caused by the XY heater. The waveguide segments HI and OP are herein referred to as the heated waveguide segments because they are substantially heated by heater XY. Likewise, waveguide segments D'E' and K'L' are herein referred to as unheated segments because they are only weakly heated by heater XY.

As a consequence of the relative temperature difference between various waveguide segments caused by heater XY, light propagation through first arm (401) BR from B to R will be shifted in phase relative to light propagation through second arm (402) B'R' from B' to R'. The amount of relative phase difference is proportional to the relative temperature difference referenced to above. The amount of relative phase difference is also proportional to the sum of the lengths of the two heated waveguide segments HI and OP.

The power used to generate a predetermined relative temperature difference is proportional to the length of heater XY and the value of the predetermined relative temperature difference. Thus, as a first order approximation, the relative phase difference referred to above is independent of the length of heater XY when expressed as being proportional to the power applied to heater XY and also depends on the various details of the heater and nearby waveguide segments. The relative phase difference divided by the heater power is referred to herein as the heater efficiency.

A significant consideration for obtaining desirable performance of the MZI is the configuration of first arm BR and second arm R'B' to have no points of intersection and sections that are sufficiently close to cause excessive optical coupling between the respective sections. For the symmetric embodiment in FIG. 15, the geometrical details to ensure the desired conditions are met are described below. Waveguide segments CF, Q'N', G'J', and JM are designated to be arcs of circles with common center of curvature Z. In other words, waveguide segments CF, N'Q', G'J' and JM are designated to be arcs of concentric circles. Because MZI 400 is invariant under a 180 degree rotation about point W, waveguide segments C'F', NQ, G'J', and J'M' are consequently arcs of circles with a common center of curvature Z', where Z' corresponds to the point Z after being rotated by 180 degrees about the point W. Furthermore, the radius of curvature of the segment CF is larger than the radius of curvature of segment N'Q'; the radius of curvature of segment N'Q' is larger than the radius of curvature of segment G'J'; and the radius of curvature of segment G'J' is larger than the radius of curvature of segment JM.

A suitable configuration is to form CF segment and the N'Q' segment with arcs that have an angular extent between about 175 degrees and about 185 degrees. A suitable configuration is to form JM segment and G'J' segment with arcs that have an angular extent between about 225 degrees and about 270 degrees. These arcs (CF, N'Q', G'J', JM-C'F', NQ, GJ, J'M') should be connected to their respective rotated arcs buy segments MN, M'N', FG and F'G' that may be straight or may have slight variations from straight waveguides to allow connections to the arcs with little loss by avoiding bends and so forth. These arcs are connected to the various ports of the input coupler and output coupler by segments BC, B'C', QR and Q'R' that may be straight or may have slight variations from straight waveguides to allow connections to the arcs with little loss by avoiding bends and so forth. Many small variations from these prescribing design parameters may be introduced without affecting the intent of the design and will be so recognized by a person of ordinary skill in the art. For example, small straight sections may be inserted within a segment that is comprised primarily of an arc of a circle. As another example, a segment that is described as being an arc of a circle herein may be replicated with a curve that has a somewhat varying radius of curvature without affecting the intent of the design.

Additional features consistent with obtaining designable performance of the symmetric MZI of FIG. 15 impose restrictions on the various radii of curvature of the arcs discussed above. First, for improved heater efficiency, the separation between HI segment and OP segment should be as small as consistent within the constraint imposed by the largest acceptable optical crosstalk between adjacent optical waveguides. Constrained by the selected separation limits to obtained no more optical crosstalk than a selected cutoff value, greater heater efficiency generally is achieved by maintaining a constant separation between the HI segment and the OP segment. Thus, the separation between points H and I and between points O and P would be approximately equal. Furthermore, heater (426) XY should be centered approximately midway between the HI and OP segments, e.g., see FIGS. 4-8.

In addition, the separation between the D'E' segment and heater XY should be substantially larger than the separation between the OP heated waveguide segment and the XY heater. Likewise, the separation between the K'L' unheated waveguide segment should be substantially larger than the separation between the HI heated segment and the XY heater. These relationships follow because the relative phase difference referred to above is proportional to the temperature difference between the unheated segments and the heated segments. A suitable configuration to make the D'P (and E'O) distance approximately equal to the HL' (and IK') distance, both of which can be at least about 50 microns larger than the PH (and OI) distance. These conditions on the various separations can be met by selecting appropriate values for the radii of curvature for each of the curved sections mentioned above. Values of the various radii of curvature that were determined experimentally for devices comprising silica waveguides with 1.8% index contrast are as follows—suitable radii of curvature for segments D'E', OP, HI and K'L' are 1.500 mm, 1.410 mm, 1.390 mm, and 1.300 mm, respectively. Values within 20% of these values (±20%) would also be very effective of devices comprising silica waveguides with a 1.8% index contrast. Values that are less than 80% of these values may still be effective, but may show some noticeable penalty caused by excessive optical loss caused by optical propagation around tight bends. Values that are more than 120% of these values may still be effective, but may show some have a size that is larger than an equivalent design with the same performance. One skilled in the art would be able to modify these values for any appropriate index contrast. Also, a person of ordinary skill in the art would recognize that additional values and ranges of values within the explicit ranges above, such as the 10% variation range) are contemplated and are within the present disclosure.

Particular features of an MZI as described above can be further described with respect to the optical transfer function of either the bar path (that is the optical path between points A and S, or, equivalently, between points A' and S') or the cross path (that is the optical path between points A and A', or, equivalently, between points S and S'). When no heat applied to either the XY heater or the X'Y' heater, an MZI that is symmetric in design with respect to the input/output couplers and with respect to the two MZI arms, the optical transfer function of the bar path is close to zero and the optical transfer function of the cross path is close to unity. In such a design, with no heat applied to either the XY heater or the X'Y' heater, the majority of the light, regardless of wavelength, travels through the cross path. In such a design, incrementally increasing the heat applied to either the XY heater or the X'Y' heater, incrementally reduces the amount of light that travels through the cross path and increases the amount of light that travels through the bar path. Although this feature may be desirable for many applications, such as a normally dark variable optical attenuator (VOA), other configurations may be more suitable for other applications. In one example, there may be an application in which, with no heat applied to either the XY heater or the X'Y' heater, the majority of the light travels through the bar path. In another example, there may be an application in which some wavelength dependence in the optical transfer function is desired. For such applications, a slight asymmetry in the MZI design may be preferred.

In a representative alternative embodiment, the MZI can be slightly asymmetric such that the optical path length along the first arm BR is different than the optical path along the second arm R'B' by an amount that is not greater than the wavelength of light intended for the application of the MZI One way to achieve the required optical path length difference is to provide the FG waveguide segment with a length that is different from the F'G' waveguide segment such that the optical path length difference between the two segments has the desired value. This length adjustment is sufficiently small so that the design parameters described above meet their specified objectives. The optical path length difference may also be achieved by adjusting many other combinations of lengths of various waveguide segments. The path length difference can be effectively used for certain devices, such as a wavelength dependent optical filter.

In another representative alternative embodiment, the MZI is more asymmetric such that the optical path length along the first arm BR is different from the optical path length align the second arm R'B' by an amount that is greater than the wavelength of light intended for the application. An MZI that is asymmetric to such an extent has an optical transfer function with greater wavelength dependence, which is a desirable features for some applications, such as wavelength filtering. On way to achieve the specified optical path length difference is to provide the FG waveguide segment with a length different form the F'G' segment such that the optical path length difference between the two segments is the selected value. The optical path length difference may be achieved by adjusting many other combinations of lengths of various waveguide segments. This length adjustment is still sufficiently small so that the design parameters described above meet their desired objectives. For relatively large adjustments to the various waveguide segments, additional adjustments may be correspondingly made to the design parameters described above to provide that the objectives are achieved. For symmetric or asymmetric embodiments, thermal simulation is one method for determining the performance of the embodiments for a particular application and for determining other parameters necessary to provide the desired device performance.

Various configurations for the XY heater are suitable for each of the embodiments described above. The XY heater may lie entirely between the OP segment and the HI segment such that no portion of the heater is directly above any portion of the OP segment or the HI segment. Alternatively, the XY heater may partially overlap both the OP segment and the HI segment such that a fractional portion of the heater is directly above some portion of the OP segment and the HI segment. In yet another alternative, the XY heater may completely overlap both the OP segment and the HI segment such that some portion of the heater is directly above the entire portion of the OP segment and the HI segment. In yet another alternative, the XY heater may be a two segment heater with a first XY heater segment positioned at least partially over the OP waveguide segment and the second XY heater segment positioned at least partially over the HI segment. The XY heater may be configured so that it generates heat when current flows continuously from point X to point Y. Alternatively, the XY heater may be configured so that it generates heat when current flows continuously from point Y to point X. In yet another alternative embodiment, the XY heater may be configured so that it generates heat when current enters the heater at a point midway between X and Y and flows, in part towards point X and, in part towards point Y. These various configurations can correspondingly apply to the other arm wherein the corresponding segments are labeled with a prime ('). Also, these configurations can be further understood with reference to FIGS. 4-12 that reference heater configurations in the context of an isolated waveguide arm.

Figure 16:
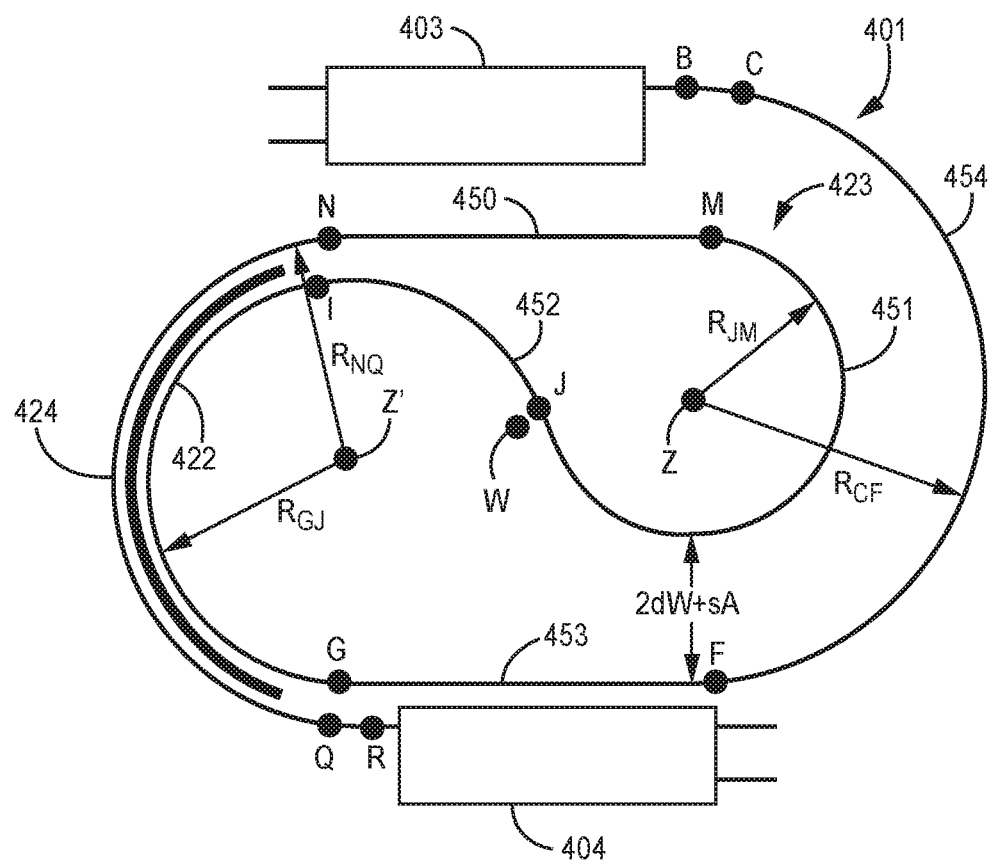
FIG. 16 is a schematic top view of the MZI of FIG. 14 in which one MZI arm is removed to provide a clearer view of geometrical parameters to enable a compact footprint.
Figure 17:
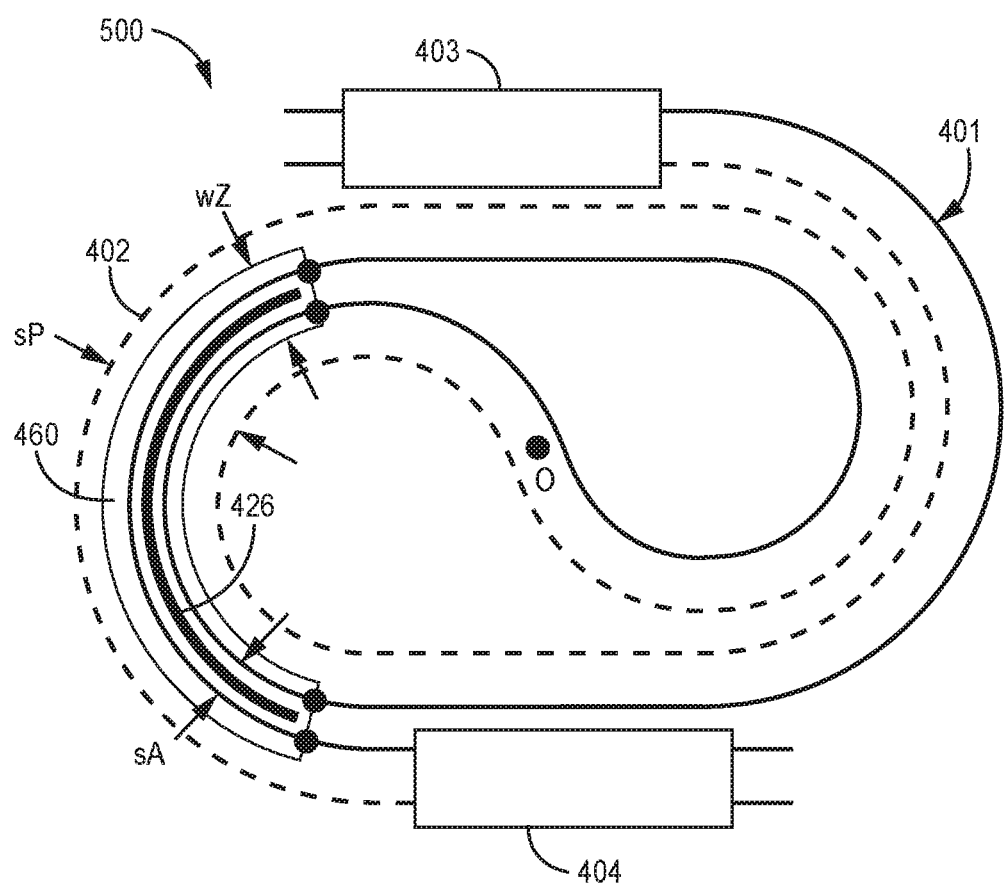
FIG. 17 is a schematic top view of the MZI of FIG. 16 with the depicted arm rotated 180 degrees to form the MZI of FIG. 14 emphasizing the ability of the second arm to nest within accessible open space of the first arm.
Figure 18:
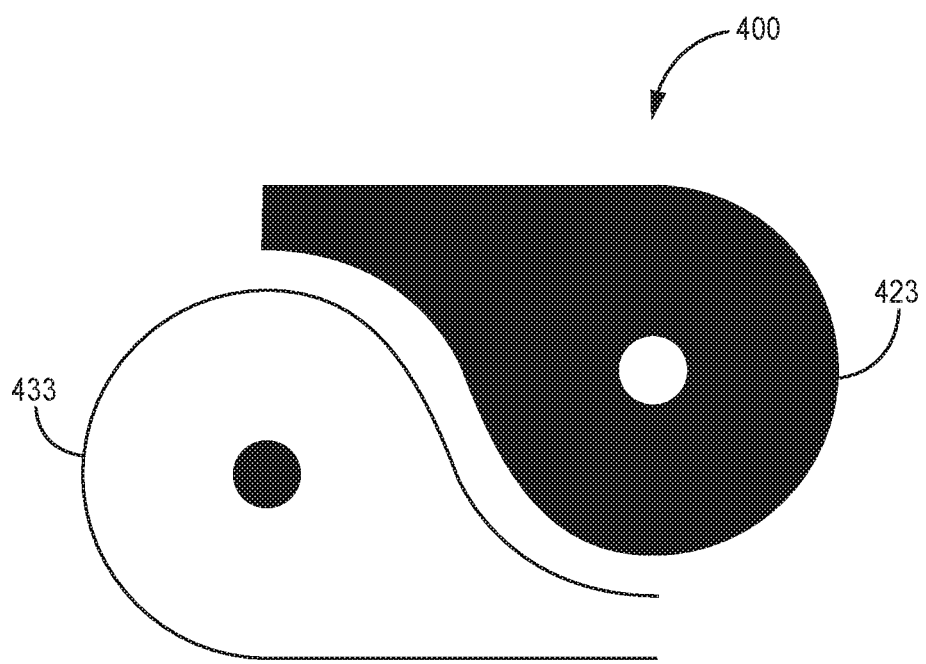
FIG. 18 is a schematic top view of the phase shifters of the MZI of FIG. 14 emphasizing the Yin Yang characteristic of the configuration.

To clarify some of the features illustrated in FIGS. 14 and 15, a subset of the features is illustrated in FIG. 16, and FIGS. 17 and 18 present alternative visual perspectives to emphasis various aspects of the embodiment. FIG. 16 illustrates the embodiment of the MZI in FIG. 14 with second MZI arm 402 excluded for clarity. Referring to FIG. 16, advantageous relationships for some of the geometrical aspects of the MZI structure can be emphasized, which are explain in some detail with respect to FIG. 15. As illustrated in FIG. 16, loopback waveguide section 423 comprises extension segment 450 (MN of FIG. 15), loop portion 451 (JM of FIG. 15) and reversal segment 452 (IJ of FIG. 15). Extension segment 450 is depicted as a straight portion of waveguide between two marked points (JM of FIG. 15), although this straight condition can be relaxed as noted above, and reversal segment 452 is between points I and J where J notes a transition point with respect to the sign of the curvature of the waveguide path. Loop portion is positioned between points J and point M. The end of extension segment 450 can mark a point at which the radius of curvature becomes greater than the average radius of curvature of inner heated arc 422, which is $R_{GJ}$ for the specific embodiment depicted in FIG. 16. Loopback waveguide section 433 of second arm 402 has equivalent sections as described for loopback waveguide section 423 of first arm 401. Loop portion 451 of loopback waveguide section 423 is aligned with the arc of a circle of radius $R_{GJ}$ that is centered at point Z. In addition, inner heated arc 422 of first MZI arm 401 is aligned with the arc of a circle of radius $R_{GJ}$ that is centered at point Z', and outer heated arc 424 of first MZI arm 401 is aligned with the arc of a circle of radius $R_{NQ}$ that is also centered at point Z'. The midpoint between Z and Z' is illustrated as point W in FIG. 16. In this embodiment, the value of $R_{JM}$ smaller than the value of $R_{GJ}$ by at least dR and $R_{NQ} > R_{GJ}$. The value of 2 dW+sA is the center to center distance marked in FIG. 16 between waveguides in loop portion 451 and waveguide extension 453 (FG in FIG. 15) at their point of closest approach in the embodiment of FIG. 16.

Waveguide extension 453 (FG in FIG. 15) is a straight waveguide section between points F and G in FIG. 16, and this waveguide section provides for connecting inner heated arc 422 and outer arc 454. Outer arc 454 and waveguide extension 453 provide for the rolled configuration allowing for nesting of the two MZI arms in FIG. 14. While waveguide extension 453 is shown as straight in the figures, waveguide extension 453 can have some curvature with a large average radius of curvature to provide for the overall structure. Outer arc 454 (CF of FIG. 15) is depicted as circular, but this condition can be relaxed without a significant change in the overall structure. If outer arc 454 is not precisely circular, radius $R_{CF}$ can be considered the average radius.

To obtain the structure of FIG. 14 from the redacted structure in FIG. 16, second arm 402 (not illustrated in FIG. 16) can be formed by taking a copy of first arm 401 at the identical initial location and rotating that copy 180 degrees about the point W illustrated in FIG. 16. With the aforementioned restrictions on the two radii of curvature, the loopback path of the phase shifter of second arm 402, thus formed, fits within the footprint of the first phase shifter and is substantially aligned to a circle that is smaller than and concentric with the circle to which the first phase shifter is aligned. The rotated structure is shown in FIG. 17 with the second waveguide shown with dashed lines. Furthermore, outer arc section 454 of first arm 401 between point CF has a convenient shape of a circular arc of radius centered at Z such that the arc has a radius, $R_{CF}$, that is larger than the value of $R_{JM}$ by at least dR. By forming the second arm as a copy of the first arm and rotating the copy by 180 degrees, this restriction of the outer arc section is the replicated waveguide section fitting outside of the first phase shifter and is substantially aligned to a circle that is larger than and concentric with the circle to which the first phase shifter is aligned.

More generally, as shown by the dashed line in FIG. 17, second MZI arm 402, thus formed, is rolled up within the region of first MZI arm 401 without causing any optical impairment such as waveguide crossings or waveguides that approach more closely than generally preferred according to the design rules associated with the particular PLC system used for the MZI. By forming the second arm as a rotated version of a copy of the first arm, the optical path length for the first arm equal to the optical path length of the second arm, although alternative embodiments are discussed above with differences in the path lengths that break the symmetry. Generally, an MZI having an optical path length for the first arm equal to the optical path length of the second arm is referred to as a symmetric MZI. As known in the art, a general advantage of a symmetric MZI is that the configuration reduces the wavelength dependence of the MZI optical performance. But asymmetries can be introduced to provide a greater wavelength dependence in the performance, which can be advantageous for appropriate devices.

FIG. 17 illustrates the MZI embodiment of FIG. 14 with the second arm illustrated with a dashed line and omitting reference numbers for clarity and illustrates additional advantageous values for some of the geometrical aspects of the MZI embodiment. In the context of this figure, we assume that heat is to be applied to the thermo-optic phase shifter (heater) 426 on first arm 401. Since the function of this heater is to increase the temperature of the sections of first arm 401 relative to second arm 402, it is desirable that all sections of second arm 402 be located substantially far from heater 426 to keep the temperature rise in these sections of second arm 402 to acceptable levels. Stated in other words, heater 426 for the thermo-optic phase shifter on first arm 401 is considered to provide a thermal zone 460 around the heater during its operation, in which the thermal zone note the region where the heating within a threshold value takes place. Outer curved heated waveguide section (outer heated arc) 424 and inner curved heated waveguide section (inner heated arc) 422 are appropriately situated within thermal zone 460, and all sections of second arm 402 are appropriately situated outside thermal zone 460. To achieve this performance, it can be appropriate to have the sections of second arm 402 that bound first heater 426 to have a separation, sP, that is substantial and to have the first heater situated approximately equidistant from the two waveguide sections of second arm 402 on the respective sides of first heater 426.

The details of the materials used and other detailed features of the waveguide design determine suitable numerical value for the preferred value for sP. Those skilled in the art can determine appropriate restrictions for sP from thermal simulation or from experimental measurement. For example, for silica channel waveguides with 1.8% index contrast formed on silicon substrates, in some embodiments it is suitable to have the sP value at least 100 microns and in further embodiments sP can be within the range from 200 microns to 400 microns. A person of ordinary skill in the art will recognize that additional ranges of sP within the explicit ranges above are contemplated and are within the present disclosure. Increasing the value of sP beyond 400 microns, may cause an undesired increase the size of the MZI and offer only very slight improvement in thermal efficiency. One configuration that will provide the selected value of sP, is a configuration wherein $R_{GJ}-R_{JM}>sP/2$ and wherein $R_{CF}-R_{NQ}>sP/2$. Alternatively, various straight sections or other sections may be adjusted in length while maintaining $R_{GJ}-R_{JM}=sW/2$ and wherein $R_{CF}-R_{NQ}=sW/2$.

FIG. 18 schematically illustrates the loopback waveguide section 423 of first arm 401 and loopback waveguide section 433 of second arm 402 of the MZI of FIG. 17. For clarity, the interior of the loopback waveguide on the first arm is shaded and the centers of curvature for the longest arc segments are illustrated with particular emphasis. When the phase shifter is activated on the arm comprising the loopback waveguide section 423 of first arm 401, the relative phase difference between the arms is driven in one direction and when the phase shifter is activated on the arm comprising the loopback waveguide section 433 of second arm 402, the relative phase difference between the arms is driven in the opposite directions. The opposing directions of these forces and the general shape of this configuration may be remembered more easily by referring to this configuration as a Yin Yang MZI.

Figure 19:
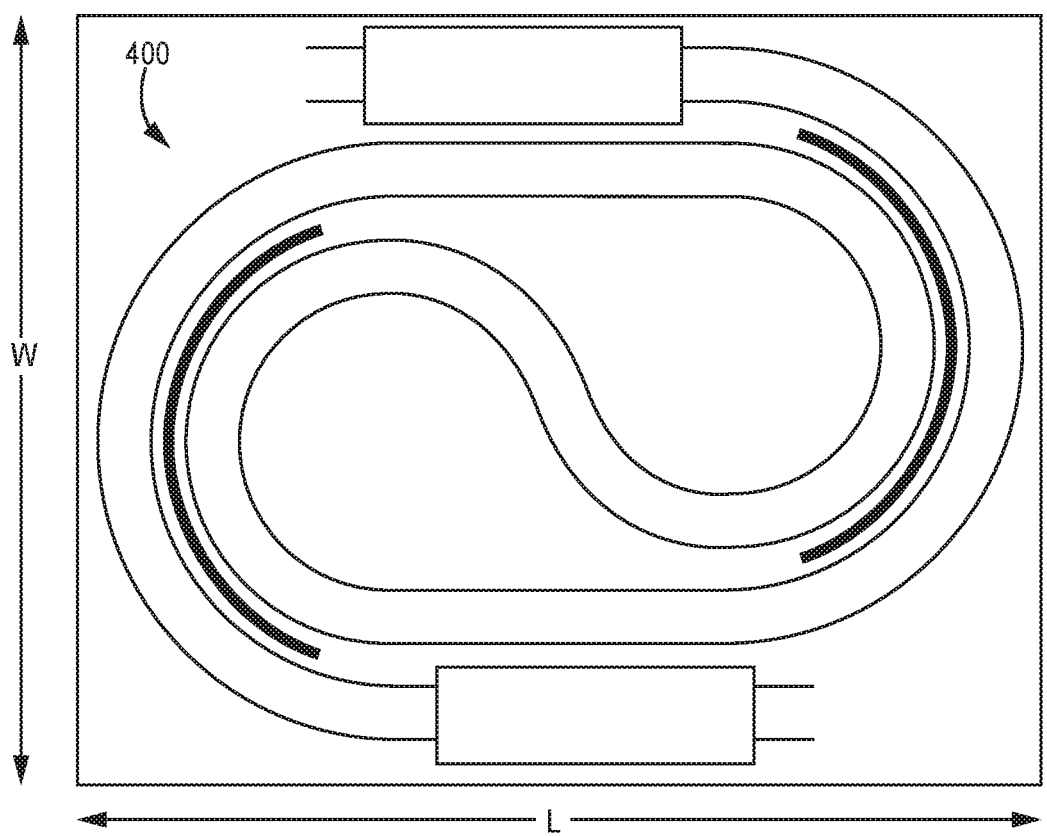
FIG. 19 is a schematic top view of the MZI of FIG. 14 illustrating the compact footprint that is possible with this configuration.

FIG. 19 illustrates the compact nature of the Yin Yang MZI by illustrating that it can fit within a rectangular footprint with a length L and a width W. Reasonable ranges for these size parameters are set by the smallest acceptable radius of curvature for the loopback sections of the respective waveguides and the closest distance of waveguides with acceptable levels of optical crosstalk. For a device based on silica waveguides with a 1.8% index difference, values of length can be from about 4.8 mm to about 7.2 mm, and the width can be from about 2.1 mm to about 3.1 mm.

Further embodiments of an MZI may be derived from the aforementioned embodiment of FIG. 19 by making adjusting the length, curvature and/or configuration of some of the waveguide sections such that the adjustments are small enough to preserve the desirable nesting feature described above, but yet provides an optical path length difference between the first arm and the second arm that is a significant in comparison with the wavelength of light that is intended to propagate through the device. Generally, an MZI having an optical path length for the first arm unequal to the optical path length of the second arm is referred to as an asymmetric MZI. For one example, an MZI with an optical path length difference between the first arm and the second arm that is on the order of four times smaller than the nominal wavelength of light may be suitable for a push-pull VOA as described in U.S. Pat. No. 6,658,174B1. As a second example, an MZI with an optical path length difference between the first arm and the second arm that is larger than the nominal wavelength of light may be useful in cases where increased wavelength dependence is desirable.

Figure 20:
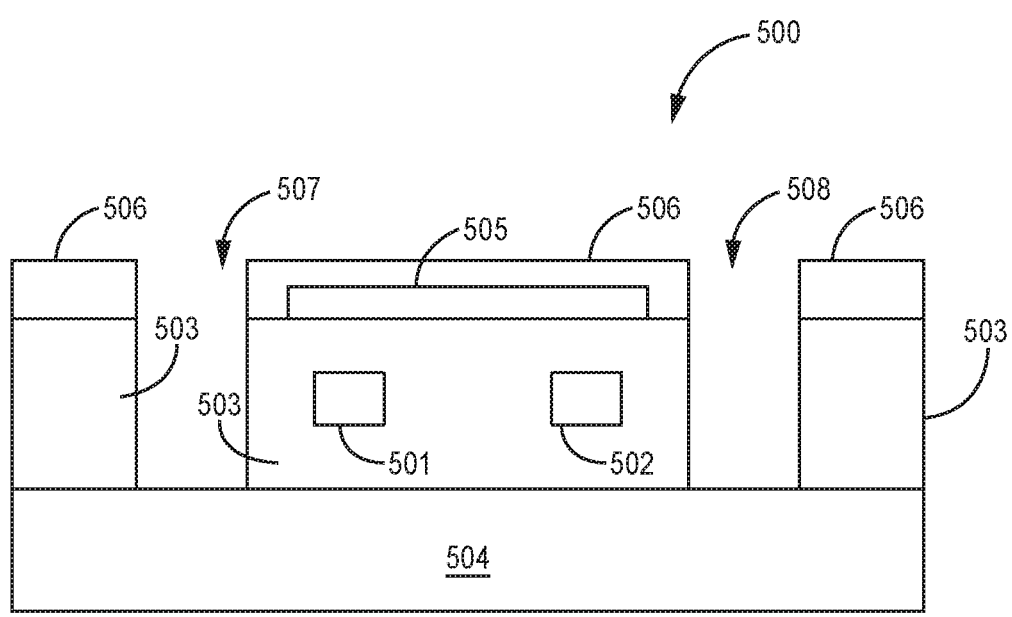
FIG. 20 is a schematic cross section view of a thermo-optic phase shifter as described herein further comprising trenches to provide additional thermal isolation of the heated section.

As illustrated in FIG. 20, trenches can be placed within the planar lightwave circuit to reduce heat dissipation in the targeted waveguides to further improve efficiency. Trenches in the planar structure, e.g., a silica glass structure, can be used to insulate the heated areas to provide for further improvements in thermal efficiency and/or device layout. While the heater configuration can itself result in many of the desired energy efficiencies, the trench can further improve efficiencies as well as reduce undesirable heating of adjacent unheated waveguides so that unheated waveguides can be placed closer to heated waveguides without an undesirable reduction in temperature difference. FIG. 20 shows a sectional view of a phase shifter 500 similar to that in FIG. 4 with a pair of heated waveguide sections 501, 502 surrounded by cladding 503 on optional substrate 504 with a heater 505 located on cladding 503 and an optional coating 506, except for the inclusion of trenches 507, 508 in the embodiment of FIG. 20. The trenches can be added similarly for efficiency to the embodiments in FIGS. 4-8 or other suitable heater designs. The trenches can have a width across the plane of the PLC perpendicular to the center of the trench for a silica waveguide with a 1.8% index difference from about 30 microns to about 50 microns, in further embodiments from about 15 microns to about 100 microns, and in other embodiments from about 5 microns to about 200 microns. The trench generally extends through any cladding, through to a distance below the core depth of the waveguides. The length of the trenches can extend parallel to the heater for the lengths of the thermal zone. A person of ordinary skill in the art will recognize that additional ranges of trench dimensions within the explicit ranges below are contemplated and are within the present disclosure.

Figure 21:
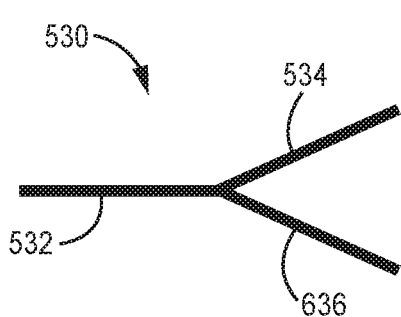
FIG. 21 is a schematic view of an input coupler comprising a Y-branch.
Figure 22:
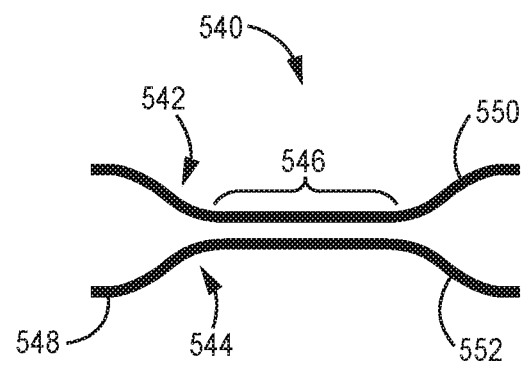
FIG. 22 is a schematic view of an input coupler comprising a directional coupler.
Figure 23:
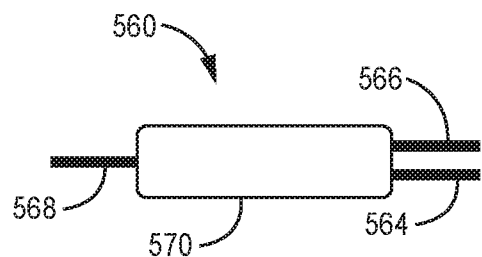
FIG. 23 is a schematic view of an input coupler comprising a 1×2 multimode interference device (MMI).
Figure 24:
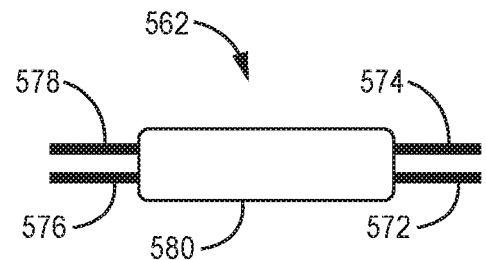
FIG. 24 is a schematic view of an input coupler comprising a 2×2 MMI.

FIGS. 21-24 illustrate a variety of input coupler (splitter) configurations that may be used with the MZI described herein, although other configures can be used as desired. FIG. 21 illustrates a Y-branch coupler 530 with an input waveguide 532, first output waveguide 534 and second output waveguide 536. FIG. 22 illustrates a directional coupler 540 comprising a first waveguide 542 and a second waveguide 544 that approach closely at a coupling zone 546 to provide for desired coupling between an input waveguide segment 548 and output waveguide segments 550, 552. FIG. 23 illustrates a 1×2 multimode interference (MMI) device 560, and FIG. 24 illustrates a 2×2 MMI 662. MMI are designed with single mode waveguides optically coupled with a multimode region designed to allow interference to provide the desired coupling (or splitting function). Referring to FIG. 23, output waveguides 564, 566 connect to input waveguide 568 through multimode region 570. Referring to FIG. 24, output waveguides 572, 574 couple to input waveguides 576, 578 through multimode region 580. The use of MMI as couplers/splitter for MZI generally are discussed in published U.S. patent application 2012/0062900 to Langley et al., entitled "Optical Waveguide Splitters," incorporated herein by reference. Additional variations on couplers not illustrated include, for example, a stabilized coupler and an adiabatic coupler. Any of these and other variations on couplers known in the art or developed in the future may be practiced within the MZI described herein.

Figure 25:
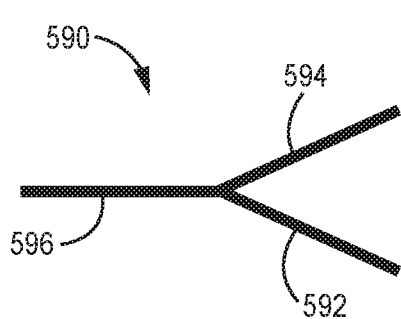
FIG. 25 is a schematic view of an output coupler comprising a Y-branch.
Figure 26:
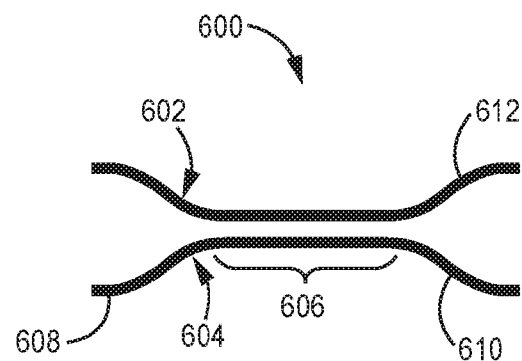
FIG. 26 is a schematic view of an output coupler comprising a directional coupler.
Figure 27:
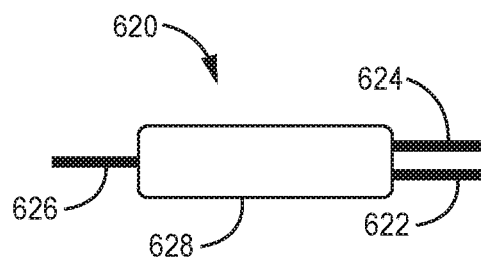
FIG. 27 is a schematic view of an output coupler comprising a 1×2 MMI.
Figure 28:
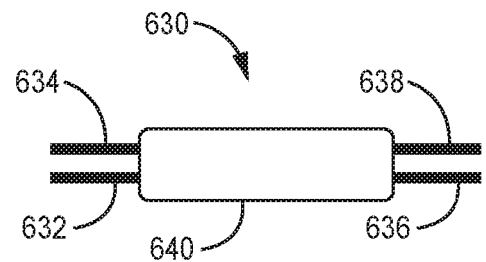
FIG. 28 is a schematic view of an output coupler comprising a 2×2 MMI.

FIGS. 25-28 illustrate a variety of output coupler configurations that may be used with the MZI described herein, which are analogous to the input splitter embodiments in FIGS. 21-24. FIG. 25 illustrates a Y-branch coupler 590 with input waveguides 592, 594 coupled to output waveguide 596. FIG. 26 illustrates a directional coupler 600 comprising a first waveguide 602 and a second waveguide 604 that approach closely at a coupling zone 606 to provide for desired coupling between an output waveguide segment 608 and input waveguide segments 610, 612. FIG. 27 illustrates a 1×2 MMI 620 comprising input waveguides 622, 624 connect to output waveguide 626 through multimode region 628. FIG. 28 illustrates a 2×2 MMI 630 comprising input waveguides 632, 634 couple to output waveguides 636, 638 through multimode region 640. Additional variations on output coupler designs not illustrated include, for example, a stabilized coupler and an adiabatic coupler. Any of these output coupler designs and other variations known in the art or developed in the future may be practiced within the MZI described herein.

The materials for forming the PLC can be deposited on a substrate using CVD, variations thereof such as PECVD, flame hydrolysis or other appropriate deposition approach. Suitable substrates include, for example, materials with appropriate tolerance of higher processing temperatures, such as silicon, ceramics, such as silica or alumina, or the like. In some embodiments, suitable silicon dioxide precursors can be introduced, and a silica glass can be doped to provide a desired index of refraction and processing properties. Similar, deposition and doping can be performed for other optical materials. The patterning can be performed with photolithography or other suitable patterning technique. For example, the formation of a silica glass doped with Ge, P and B based on plasma enhanced CVD (PECVD) for use as a top cladding layer for a PLC is described in U.S. Pat. No. 7,160,746 to Zhong et al., entitled "GEBPSG Top Clad for a Planar Lightwave Circuit," incorporated herein by reference. Similarly, the formation of a core for the optical planar waveguides is described, for example, in U.S. Pat. No. 6,615,615 to Zhong et al., entitled "GEPSG Core for a Planar Lightwave Circuit," incorporated herein by reference. The parameters for formation of an appropriate waveguide cores and cladding are known in the art.

The PLC can be configured with optical connectors at or near edges of the structure to provide for coupling to an optical fiber or other external light channel or waveguide. Thus, the PLC can be integrated with other optical structures of an optical telecommunications network as desired. The PLC with the MZI can be packaged appropriately for handling. The PLC can provide for reduced energy consumption for optical network facilities.

The more efficient device can be packaged with respective optical couplers/splitters at the ends of the Mach-Zehnder interferometer to form a stand-alone product, or this component can be integrated into a multidevice planar lightwave circuit (PLC).

The embodiments above are intended to be illustrative and not limiting. Additional embodiments are within the claims. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein. To the extent that specific structures, compositions and/or processes are described herein with components, elements, ingredients or other partitions, it is to be understand that the disclosure herein covers the specific embodiments, embodiments comprising the specific components, elements, ingredients, other partitions or combinations thereof as well as embodiments consisting essentially of such specific components, ingredients or other partitions or combinations thereof that can include additional features that do not change the fundamental nature of the subject matter, as suggested in the discussion, unless otherwise specifically indicated.

What is claimed is:

1. A planar lightwave circuit comprising a Mach-Zehnder interferometer along a plane of the planar lightwave circuit the Mach-Zehnder interferometer comprising:
    an input optical coupler;
    an output optical coupler;
    a first optical waveguide arm optically connecting between the input optical coupler and the output optical coupler comprising an outer curved heated section, an inner curved heated section adjacent the outer curved heated section, and a loopback section connecting the outer curved heated section and the inner curved heated section;
    a first heater associated with the first waveguide arm, wherein the first heater is positioned to significantly heat both the outer curved heated section and the inner curved heated section of the first waveguide arm wherein a projection of the heater in a plane of the waveguides is curved; and
    a second optical waveguide arm optically connecting between the input optical coupler and the output optical coupler, wherein the second optical waveguide is not significantly heated by the heater,
    wherein the waveguides comprise cores formed from silica glass and wherein all significantly heated waveguide sections are curved.

2. The planar lightwave circuit of claim 1 wherein a projection of the first heater into the plane of the first waveguide arm is positioned in the plane between two adjacent sections of the first waveguide arm, the relative positions of the adjacent sections specifying inner edges of the adjacent waveguide sections closest to the adjacent waveguide section and outer edges furthest from the adjacent waveguide section perpendicular to the light path, and with an extent of the heater in the plane no further than the outer edges of the adjacent sections of the first waveguide arm.

3. The planar lightwave circuit of claim 1 further comprising a second heater associated with the second waveguide arm.

4. The planar lightwave circuit of claim 1 wherein the first optical waveguide arm comprises an outer curved heated section, an inner curved heated section, and a loopback waveguide section connecting the outer curved heated section and the inner curved heated section, wherein the outer curved heated section and inner curved heated section are adjacent each other with the inner curved heated section having a smaller average radius of curvature than the outer curved heated section and a larger average radius of curvature than the loopback waveguide section such that an open accessible space is formed enclosed in part by the arc of the inner curved heated section.

5. The planar lightwave circuit of claim 4 wherein the second optical waveguide arm comprises an outer curved section, an inner curved section adjacent the outer curved section and a loopback waveguide section, at least a portion of the loopback waveguide of the second optical waveguide arm being located in the open accessible space of the first optical waveguide arm.

6. The planar lightwave circuit of claim 1 further comprising a second heater associated with the second optical waveguide arm wherein a projection of the second heater into the plane of the second optical waveguide arm is positioned in the plane between two adjacent sections of the second waveguide arm, the relative positions of the adjacent sections specifying inner edges of the adjacent waveguide sections closest to the adjacent waveguide section and outer edges furthest from the adjacent waveguide section perpendicular to the light path, and with an extent of the projection of the second heater in the plane no further than the outer edges of the adjacent sections of the second optical waveguide arm, and wherein the second heater does not significantly heat the first optical waveguide arm.

7. The planar lightwave circuit of claim 6 wherein the projection of the heaters in the plane of the optical waveguides is curved.

8. A planar lightwave circuit comprising a Mach-Zehnder interferometer along a plane of the planar lightwave circuit the Mach-Zehnder interferometer comprising:
   an input optical coupler;
   an output optical coupler;
   a first optical waveguide arm optically connecting between the input optical coupler and the output optical coupler comprising an outer curved heated section, an inner curved heated section adjacent the outer curved heated section, and a loopback section connecting the outer curved heated section and the inner curved heated section;
   a first heater associated with the first waveguide arm, wherein the first heater is positioned to significantly heat both the outer curved heated section and the inner curved heated section of the first waveguide arm wherein a projection of the heater in a plane of the waveguides is curved; and
   a second optical waveguide arm optically connecting between the input optical coupler and the output optical coupler, wherein the second optical waveguide is not significantly heated by the heater,
   wherein the first optical waveguide arm comprises an outer curved heated section, an inner curved heated section, and a loopback waveguide section connecting the outer curved heated section and the inner curved heated section, wherein the outer curved heated section and inner curved heated section are adjacent each other with the inner curved heated section having a smaller average radius of curvature than the outer curved heated section and a larger average radius of curvature than the loopback waveguide section such that an open accessible space is formed enclosed in part by the arc of the inner curved heated section, and
   wherein all significantly heated waveguide sections are curved.

9. The planar lightwave circuit of claim 8 wherein a projection of the first heater into the plane of the first waveguide arm is positioned in the plane between two adjacent sections of the first waveguide arm, the relative positions of the adjacent sections specifying inner edges of the adjacent waveguide sections closest to the adjacent waveguide section and outer edges furthest from the adjacent waveguide section perpendicular to the light path, and with an extent of the heater in the plane no further than the outer edges of the adjacent sections of the first waveguide arm.

10. The planar lightwave circuit of claim 8 wherein the waveguides comprise cores formed from silica glass.

11. The planar lightwave circuit of claim 8 further comprising a second heater associated with the second waveguide arm.

12. The planar lightwave circuit of claim 8 wherein the second optical waveguide arm comprises an outer curved section, an inner curved section adjacent the outer curved section and a loopback waveguide section, at least a portion of the loopback waveguide of the second optical waveguide arm being located in the open accessible space of the first optical waveguide arm.

13. The planar lightwave circuit of claim 1 further comprising a second heater associated with the second optical waveguide arm wherein a projection of the second heater into the plane of the second optical waveguide arm is positioned in the plane between two adjacent sections of the second waveguide arm, the relative positions of the adjacent sections specifying inner edges of the adjacent waveguide sections closest to the adjacent waveguide section and outer edges furthest from the adjacent waveguide section perpendicular to the light path, and with an extent of the projection of the second heater in the plane no further than the outer edges of the adjacent sections of the second optical waveguide arm, and wherein the second heater does not significantly heat the first optical waveguide arm.

14. The planar lightwave circuit of claim 6 wherein the projection of the heaters in the plane of the optical waveguides is curved.

15. A planar lightwave circuit comprising a Mach-Zehnder interferometer along a plane of the planar lightwave circuit the Mach-Zehnder interferometer comprising:
   an input optical coupler;
   an output optical coupler;
   a first optical waveguide arm optically connecting between the input optical coupler and the output optical coupler comprising an outer curved heated section, an inner curved heated section adjacent the outer curved heated section, and a loopback section connecting the outer curved heated section and the inner curved heated section;
   a first heater associated with the first waveguide arm, wherein the first heater is positioned to significantly heat both the outer curved heated section and the inner curved heated section of the first waveguide arm wherein a projection of the heater in a plane of the waveguides is curved;
   a second optical waveguide arm optically connecting between the input optical coupler and the output optical coupler, wherein the second optical waveguide is not significantly heated by the heater; and
   a second heater associated with the second waveguide arm,
   wherein all significantly heated waveguide sections are curved.

16. The planar lightwave circuit of claim 15 wherein a projection of the first heater into the plane of the first waveguide arm is positioned in the plane between two adjacent sections of the first waveguide arm, the relative positions of the adjacent sections specifying inner edges of the adjacent waveguide sections closest to the adjacent waveguide section and outer edges furthest from the adjacent waveguide section perpendicular to the light path, and with an extent of the heater in the plane no further than the outer edges of the adjacent sections of the first waveguide arm.

17. The planar lightwave circuit of claim 15 wherein the waveguides comprise cores formed from silica glass.

18. The planar lightwave circuit of claim 15 wherein the first optical waveguide arm comprises an outer curved heated section, an inner curved heated section, and a loopback waveguide section connecting the outer curved heated section and the inner curved heated section, wherein the outer curved heated section and inner curved heated section are adjacent each other with the inner curved heated section having a smaller average radius of curvature than the outer curved heated section and a larger average radius of curvature than the loopback waveguide section such that an open accessible space is formed enclosed in part by the arc of the inner curved heated section.

19. The planar lightwave circuit of claim 18 wherein the second optical waveguide arm comprises an outer curved section, an inner curved section adjacent the outer curved section and a loopback waveguide section, at least a portion of the loopback waveguide of the second optical waveguide arm being located in the open accessible space of the first optical waveguide arm.

20. The planar lightwave circuit of claim 15 further comprising a second heater associated with the second optical waveguide arm wherein a projection of the second heater into the plane of the second optical waveguide arm is positioned in the plane between two adjacent sections of the second waveguide arm, the relative positions of the adjacent sections specifying inner edges of the adjacent waveguide sections closest to the adjacent waveguide section and outer edges furthest from the adjacent waveguide section perpendicular to the light path, and with an extent of the projection of the second heater in the plane no further than the outer edges of the adjacent sections of the second optical waveguide arm, and wherein the second heater does not significantly heat the first optical waveguide arm.

21. The planar lightwave circuit of claim 20 wherein the projection of the heaters in the plane of the optical waveguides is curved.

* * * * *